Nov. 13, 1951  G. W. BAUGHMAN  2,574,774
REMOTE CONTROL SYSTEM
Filed April 30, 1949  9 Sheets-Sheet 1
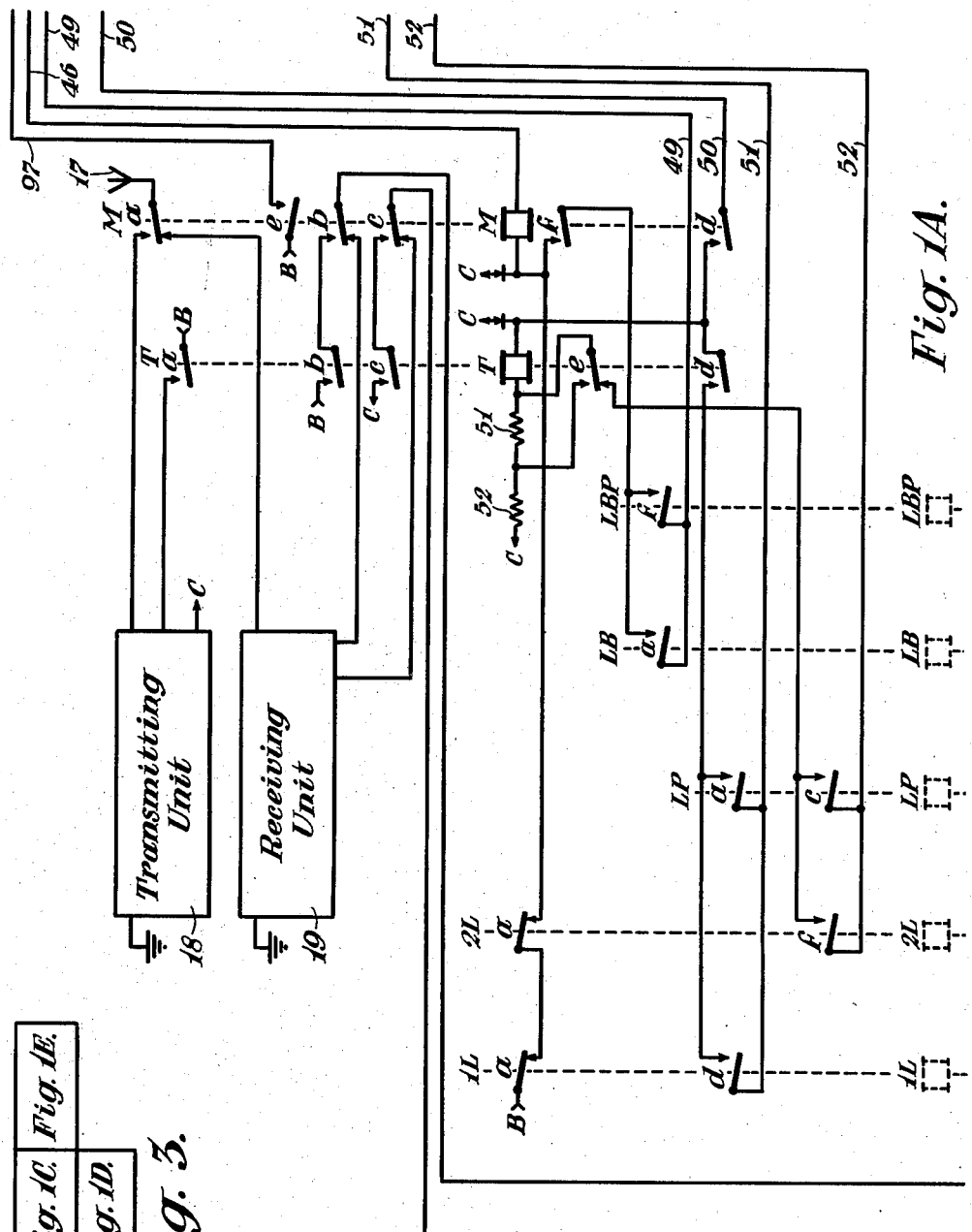
INVENTOR.
George W. Baughman
BY
HIS ATTORNEY

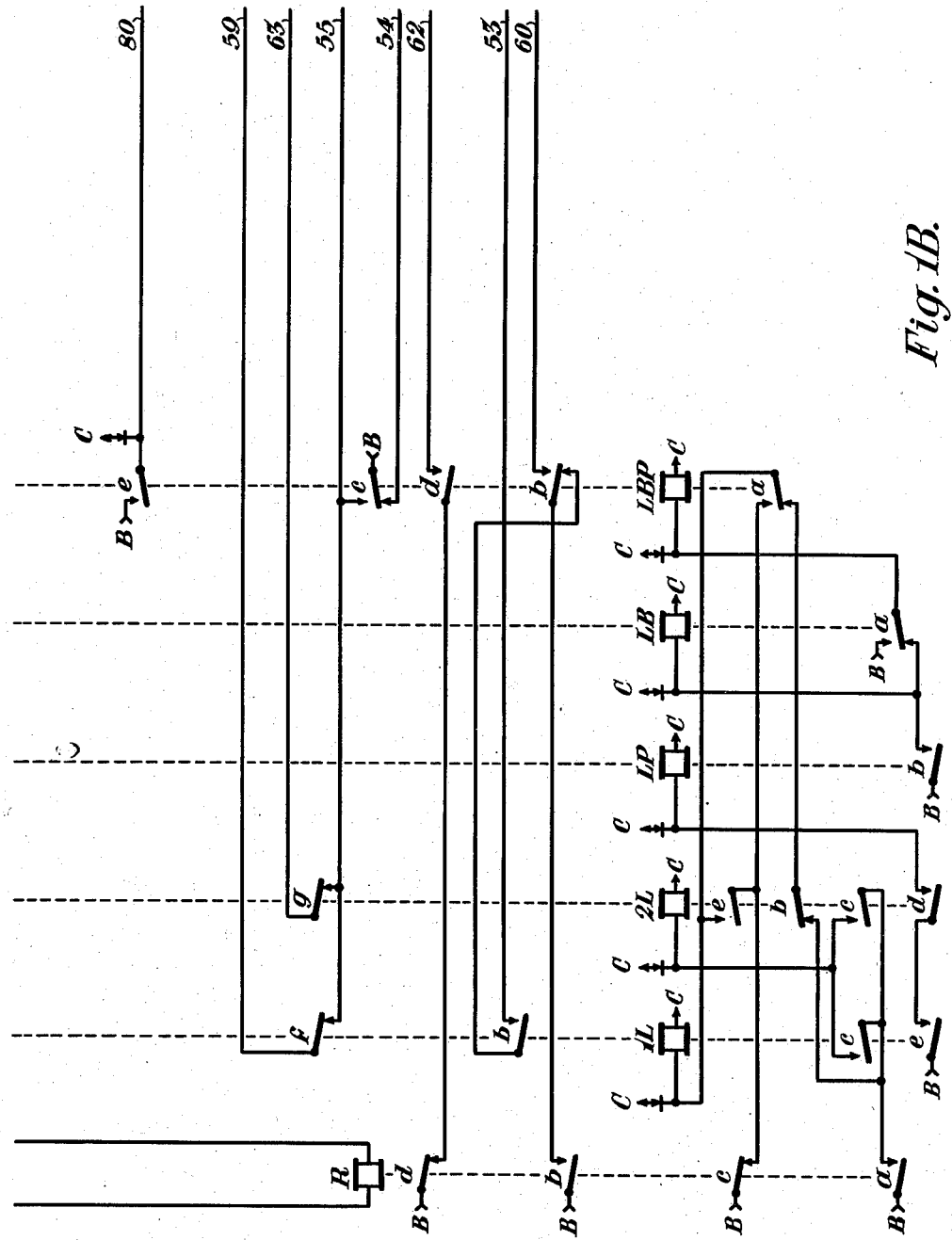

INVENTOR.
George W. Baughman
BY
HIS ATTORNEY

Nov. 13, 1951

G. W. BAUGHMAN 2,574,774

REMOTE CONTROL SYSTEM

Filed April 30, 1949

9 Sheets-Sheet 5

INVENTOR.
George W. Baughman
BY

HIS ATTORNEY

Figures 2A, 4:
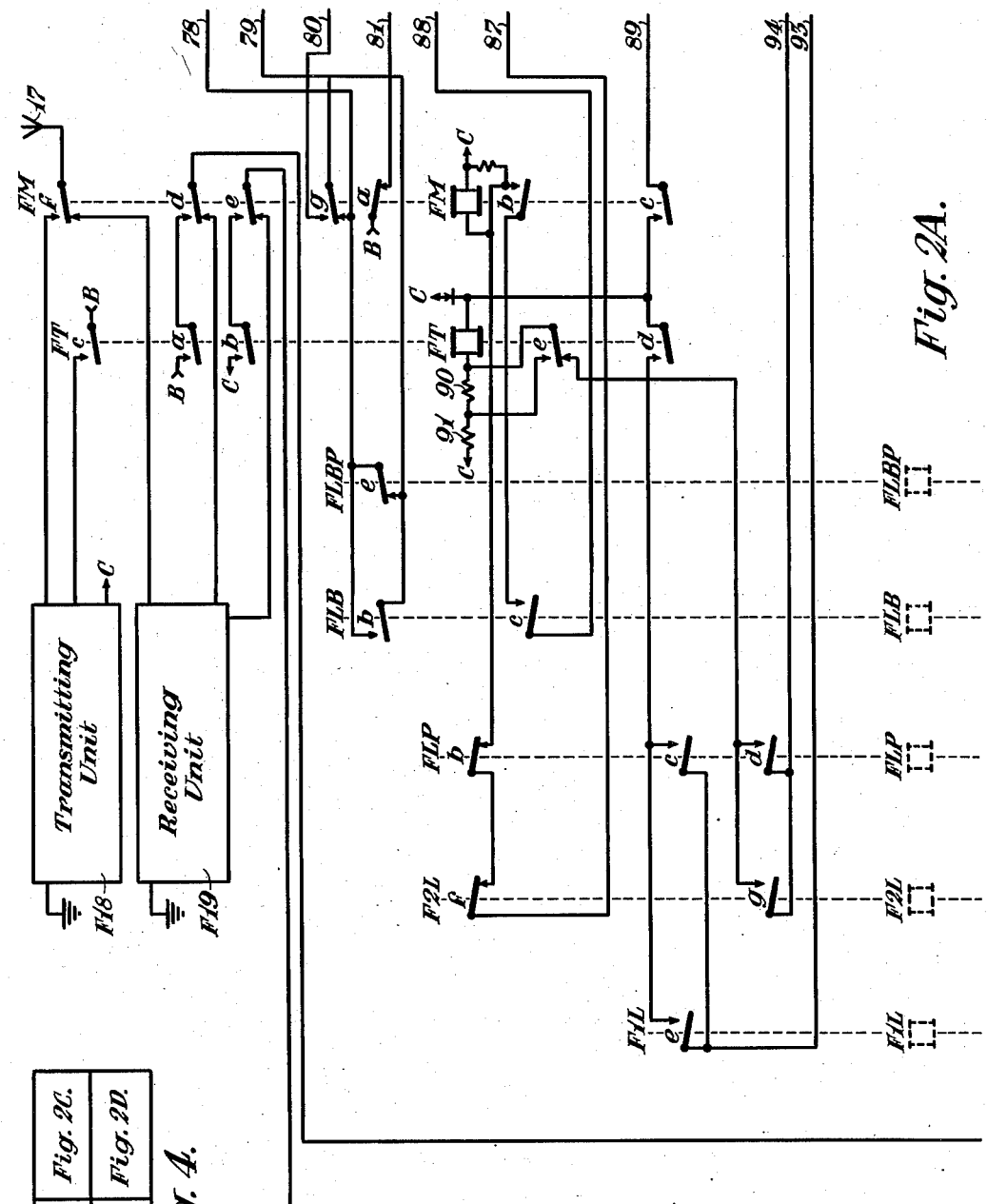
Figure 2B:
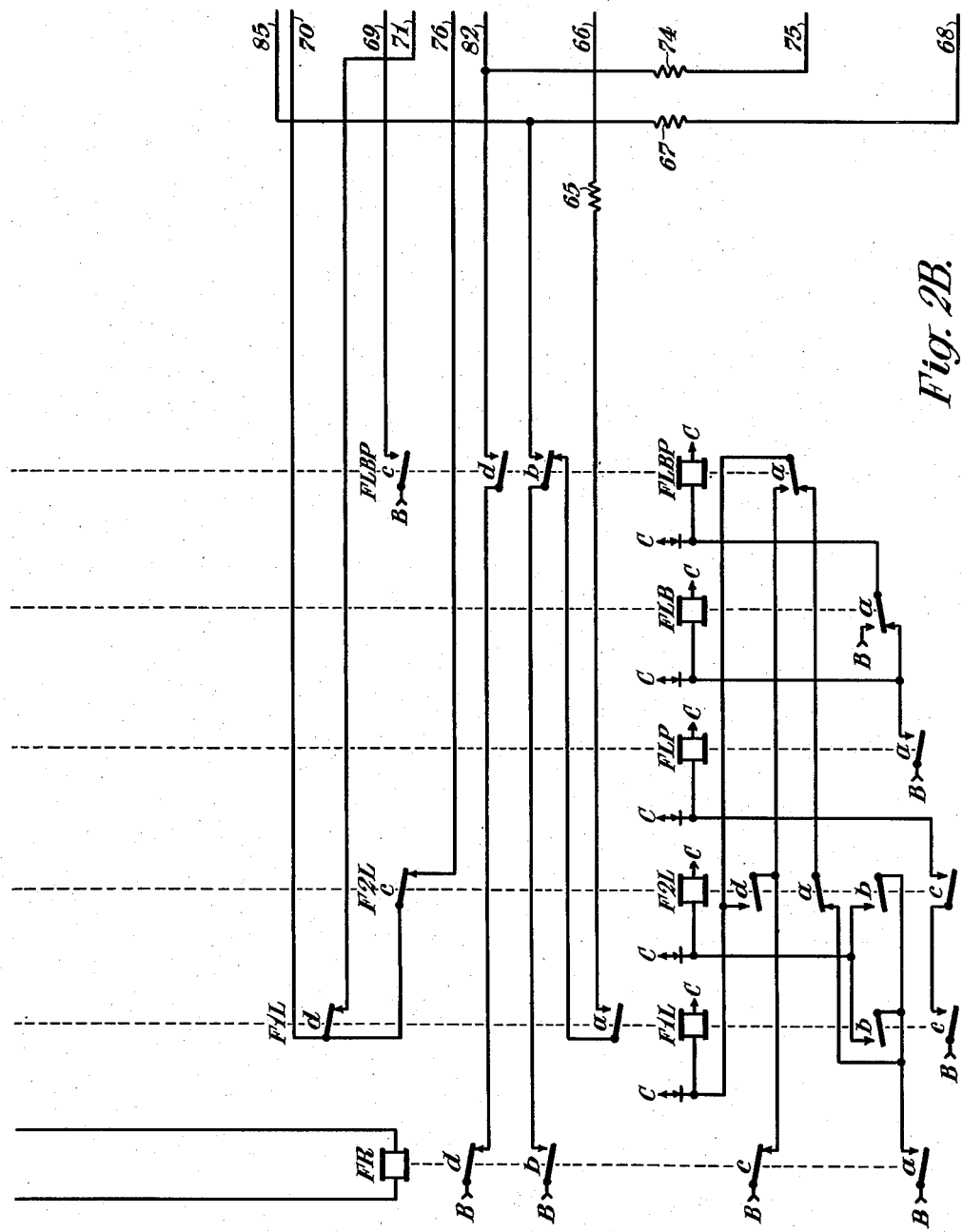
Figure 2C:
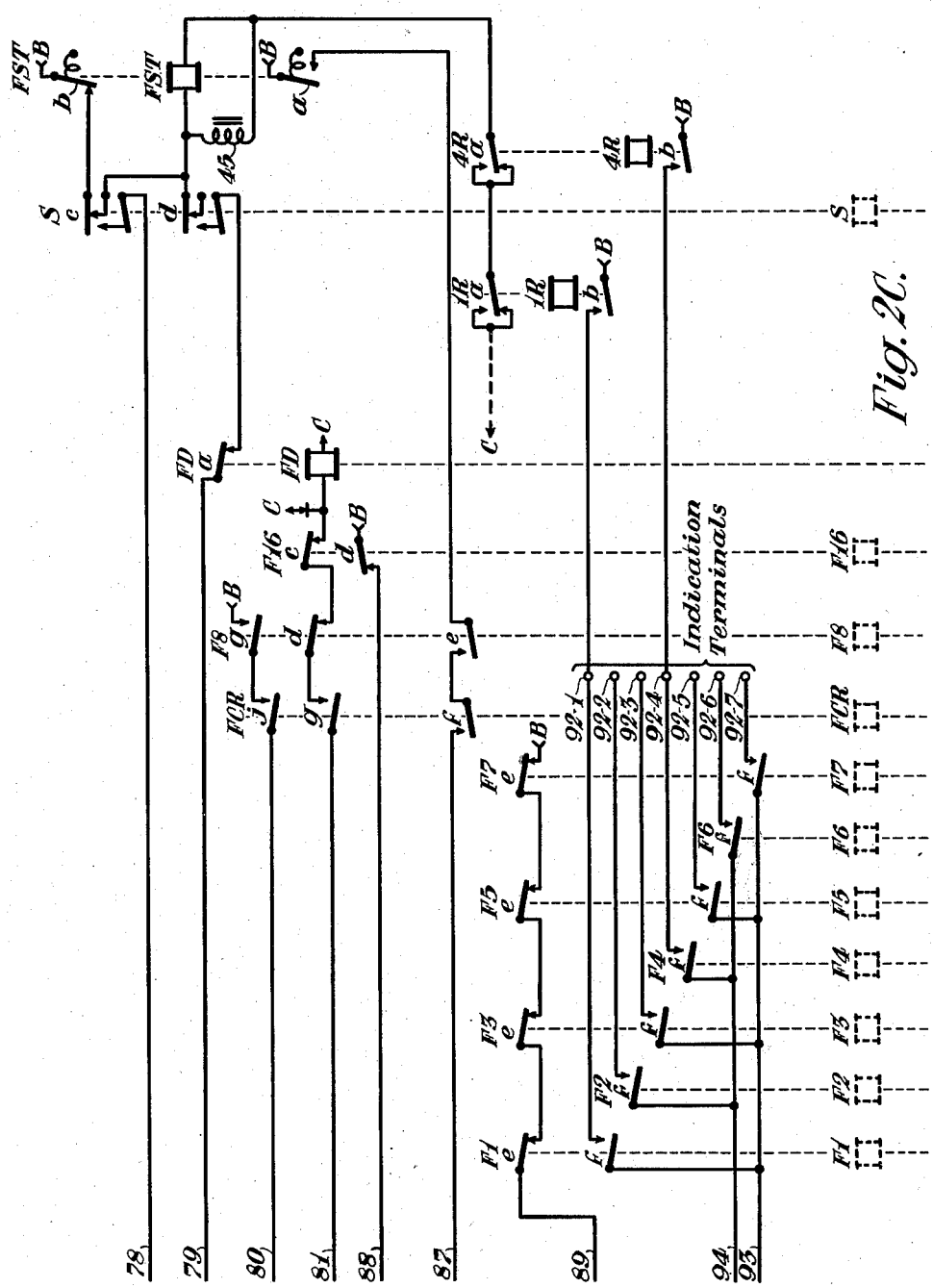
Figure 2D:
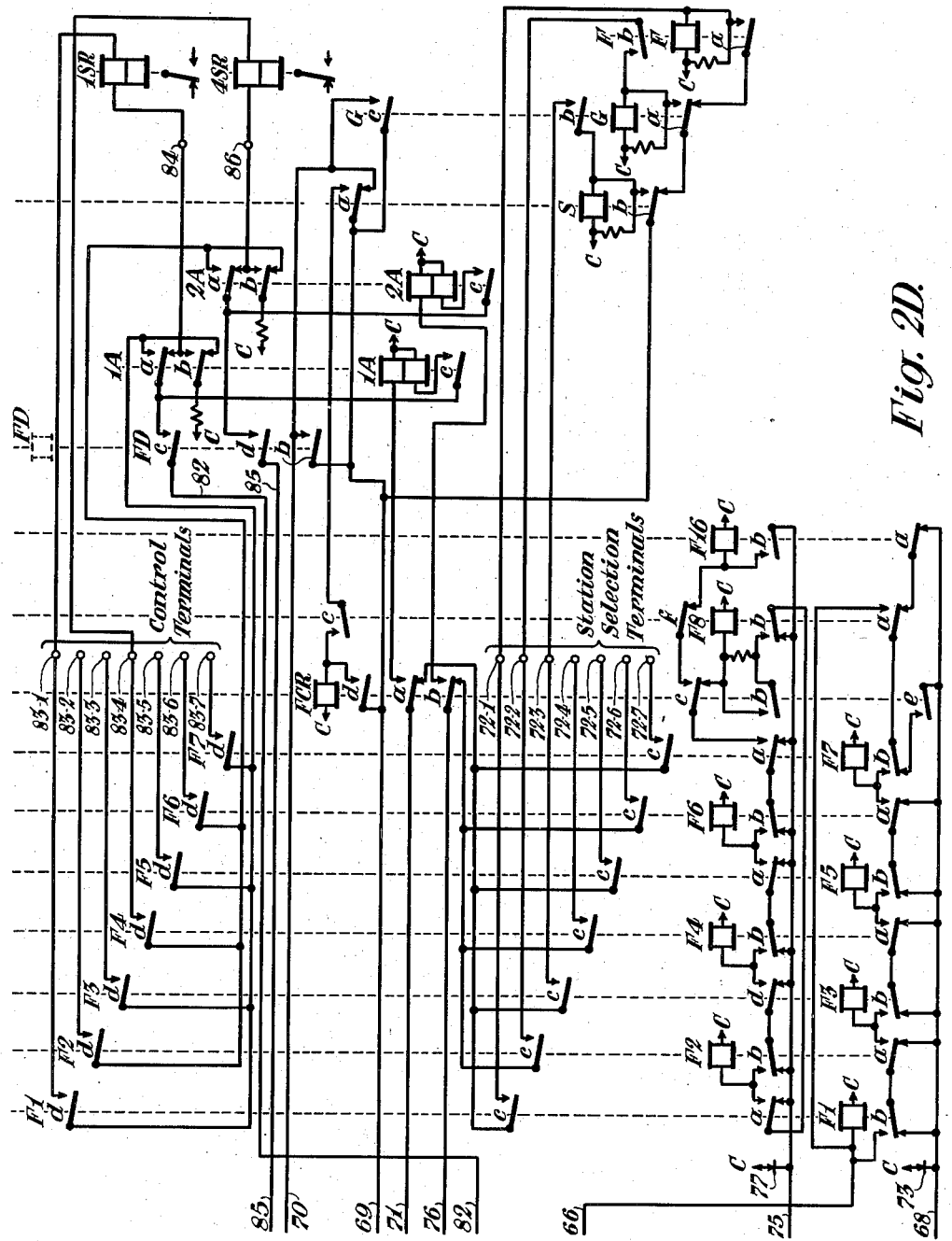

| Fig. 2A. | Fig. 2C. |
| Fig. 2B. | Fig. 2D. |

INVENTOR.
George W. Baughman
BY
HIS ATTORNEY

Nov. 13, 1951     G. W. BAUGHMAN     2,574,774
REMOTE CONTROL SYSTEM
Filed April 30, 1949     9 Sheets-Sheet 9

INVENTOR.
George W. Baughman
BY
HIS ATTORNEY

Patented Nov. 13, 1951

2,574,774

UNITED STATES PATENT OFFICE 2,574,774

REMOTE-CONTROL SYSTEM

George W. Baughman, Swissvale, Pa., assignor to Westinghouse Air Brake Company, a corporation of Pennsylvania Application April 30, 1949, Serial No. 90,627

4 Claims. (Cl. 177—353)

My invention relates to remote control systems, and particularly to systems comprising a central station, a plurality of field stations, and means providing two-way communication between the central station and each field station.

Remote control systems of the type described must be arranged so that no two stations can transmit at the same time. In accordance with my invention, I prevent such transmission conflicts between field stations by constructing each field station so that it can transmit only immediately after it has been called by the central station. I prevent transmission conflicts between the field stations and the central station by two complementary arrangements. The first of these two complementary arrangements provides that when the central station and a particular field station are both in condition to transmit messages to each other, the message from the central station is given priority. The other of the two complementary arrangements provides that when a field station starts to transmit a message to the central station, transmission by the central station is discontinued until the message is completed.

The problem of preventing conflicting transmission by two stations simultaneously in a remote control system of the type described is particularly difficult in those systems wherein a single communication channel connects all the stations. My improved system is applicable to such single channel systems generally, and furthermore is applicable to a single channel system wherein the single channel is a single radio frequency channel. My invention is shown and described herein in connection with such a single radio frequency channel system, although in its broader aspects it is not limited to use in a single channel system.

An object of my invention is to provide a remote control system including a central station and a plurality of field stations each having two-way communication with the central station, and including improved means for preventing simultaneous transmission by two stations.

Another object of my invention is to provide an improved system of the type described, in which the several stations are connected by a single communication channel.

Another object of my invention is to provide an improved system of the type described, in which communication between the several stations is accomplished over radio waves.

Another object of my invention is to provide a remote control system of the type described in which each station is provided with means for storing a message to be transmitted, and in which the stations are called in sequence by the central station independently of the message storing means.

A further object is to provide a system in which the sequential calling of the field stations by the central station is interrupted only when a message to be transmitted to or from a particular field station is stored at the time that station is called.

Another object of my invention is to provide, in each of the stations of the system of the type described, a master relay for determining whether that station is to transmit or receive messages, and improved circuits for controlling the energization of the master relay.

A further object is to provide, in each station of a system of the type described, a radio transmitter and a radio receiver, and improved circuits by which the master relay controls the receiver and transmitter.

Another object is to provide, in each of the field stations in a system of the type described, a delivery relay for determining whether the messages received by that station are to be delivered there, and improved circuits for controlling said delivery relay.

The remote control systems disclosed herein illustrate my invention as applied to a time code control circuit of the general type disclosed in Letters Patent of the United States No. 2,411,375 issued to Arthur P. Jackel on November 19, 1946, for Remote Control Systems, and other issued patents. In this type of system as disclosed in the prior art, the central station and the field stations are connected by a line wire. Communication between stations takes place by means of timed current impulses sent over the line wire and spaced by time intervals. Each code, whether sent to or from the central office, comprises a station selecting portion followed by a message portion. The station selecting portion determines the particular field station or the particular panel in the central office which is to receive the message. The message portion determines the particular relays at the field station or at the central office panel which are to be actuated.

In the system described herein, I accomplish the foregoing and other objects of my invention by providing the central station and each field station with a radio transmitter and a radio receiver. The radio code impulses may take the form of an unmodulated interrupted wave or they may be a continuous wave modulated in any desired manner. A master relay at each station determines whether its transmitter or its receiver is to be active and prevents both from being active simultaneously. The master relay at the central station is controlled to start transmission whenever the communication channel is inactive for a predetermined time. When the central station is actuated by the master relay to start transmission, it first sends a station selecting code or call signals. The central station is provided with means for storing messages to be sent to the respective field stations. Each field station is provided with means for storing a message to be sent to the central station. Each station selecting code or call signal transmitted by the central station is followed by an impulse whose length indicates whether a message for that particular field station is stored at the central station.

If a message is so stored, this impulse prepares the field station to receive the message and the transmission of the message follows, after which the master relay at the central station stops transmission.

If no message is stored at the central station, then the impulse which follows the field station call signal prepares the field station to transmit, providing a message is stored at the field station, and also terminates transmission from the central station to prevent it from interfering with the transmission by the field station. After the message is transmitted by the field station, both stations stop transmission.

If no message is stored at either the central station or the called field station, then all transmission stops after the impulse which follows the station call signal. The central station is provided with field station selecting apparatus including a rotary selector switch which is advanced one step each time the central station goes through a cycle of operation of its master relay. This apparatus causes the stations to be called in a predetermined sequence which is endlessly repeated. The selection of the field stations by this apparatus is entirely independent of the storage of messages for particular field stations.

I shall describe one form of apparatus embodying my invention, and shall then point out the novel features thereof in claims.

In the accompanying drawings, Figs. 1A, 1B, 1C, 1D and 1E, when arranged as shown in Fig. 3, form a diagrammatic view illustrating one form of central station equipment for a remote control system embodying my invention. Figs. 2A, 2B, 2C and 2D when arranged as shown in Fig. 4, form a diagrammatic view illustrating one form of field station equipment for the same remote control system.

The apparatus illustrated may be used, for example, as the central office equipment in a railroad centralized traffic control system, or it may be used as a central station for controlling several unattended repeater stations in a long distance communication system. The particular devices actuated at the field stations and the particular functions indicated at the central station form no part of my present invention, which resides in the remote control system for conveying information between the central station and the field stations.

The system illustrated sends between stations codes consisting of one or two series of code steps. Each series of steps includes several timed impulses spaced by timed intervals. Each impulse and each interval is referred to hereinafter as one step of the code. The odd steps are considered as impulses and the even steps as intervals between impulses. The system disclosed utilizes radio waves, and any form of unmodulated or modulated waves may be used, provided only that the impulses be distinguishable in some manner from the intervals. For present purposes, it will be assumed that the wave transmitted is continuous, and is modulated during the impulses and unmodulated during the intervals.

The first series of steps in each code consists of eight code steps. The first seven are utilized for calling a particular field station and the eighth is utilized for indicating whether or not a second series of steps forming a message for that station is to follow. If so, the message consists of a second series of eight steps immediately following the first. If no message is to be sent to the station called, but a message is to be sent by that station to the central station, it similarly appears as a second series of steps immediately following the eighth step of the first series, but is, of course, transmitted by the transmitter of the field station. If no message is to be sent to or received from the station called, all transmission stops after the eighth step of the first series. When all transmission stops, the code is completed, and after a brief period, the central station starts transmitting a new code which begins with the call signal of another field station.

The codes are distinguished from each other for the purpose of selectively calling the field station and for transmitting intelligence by selectively varying the length of the code steps. The normal code step is a short one and usually produces no controlling or indicating function at the station receiving it. When a particular code step is made long, it produces a particular control or indicating function at the receiving station.

*Central Station Equipment—Figs 1A to 1E*

The central station equipment includes a coding unit, a pyramid unit, and a number of field station panels. The panel for field station 123 is shown at the right in Fig. 1E. A portion of the pyramid unit is shown at the bottom of Fig. 1E. The rest of the apparatus appearing on Figs. 1A to 1E comprises the central station coding unit.

In the drawings, the contacts of each relay are shown in vertical alignment with it. The reference character associated with each relay appears immediately above it. Where contacts are shown above a relay winding, a dotted line extends upward through all the contacts and the reference character for the relay is again shown at the top of the column of contacts. In showing the circuits, the letter B has been used to indicate the positive terminal of a battery or other suitable source of electrical energy and the letter C has been used to indicate the opposite terminal.

The coding unit is provided with a counting chain of eight relays, numbered consecutively 1 to 8, inclusive, which are respectively energized during the correspondingly numbered steps of each code. These relays appear at the bottom of Fig. 1D.

The coding unit also includes a chain repeat relay CR, which is energized on the eighth step of each code. If the code includes a second series of eight steps, relay CR causes the counting chain relays 1 to 7 to be again picked up on the ninth to fifteenth steps, respectively, of the code.

A series of impulse registry relays numbered 9 to 15, inclusive, are also picked up on the ninth to fifteenth step of the code. On the sixteenth step of the code, the counting relay 8 is not picked up, but in its stead a code termination relay 16 is energized.

There is provided a timing chain of slow release relays designated as 1L, 2L, LP, LB, and LBP, which appear near the bottom of Fig. 1B. These relays all become energized during the first step of the code. As long as the station is sending or receiving short code steps, all these relays remain picked up, although one or more of them may be deenergized from time to time. When a long code step is sent or received, one or more of these timing relays releases its contacts, depending upon the length of the code step, and thereby completes a circuit for performing a control of indicating function, which function is selected in accordance with the number of the long code step.

A master relay M (Fig. 1A) determines whether the central station is to transmit or receive codes. When master relay M is picked up, the central station is in condition to transmit. Front contact $a$ of master relay M then connects an antenna 17 to the output circuit of a radio transmitter generally indicated at 18. The input circuit of transmitter 18 is controlled by a front contact $a$ of a transmitter relay T. At the same time, front contacts $b$ and $c$ of master relay M place front contacts $b$ and $c$ of transmitter relay T in control of the energizing circuit of a receiver relay R. (See Fig. 1B.)

When the master relay M releases its contacts, the central station is in condition to receive. Back contact $a$ of master relay M then connects the antenna 17 to the input circuit of a radio receiving unit generally indicated at 19, and the output circuit of the radio receiver 19 is connected over back contacts $b$ and $c$ of master relay M to the energizing circuit of receiver relay R. Also, when master relay M releases its contacts, its front contact $d$ opens the energizing circuit of transmitter relay T.

Thus, when the central station is transmitting, the transmitter relay T is intermittently energized over circuits to be described later, and the receiver relay R follows the movements of the contacts of transmitter relay T. When the central station is receiving, the transmitter relay T is continuously deenergized, and the receiver relay R follows the code impulses received through the antenna 17 and the radio receiver 19.

Station selecting apparatus is provided at the central station including a stepping switch generally indicated at 20 (Fig. 1E). The stepping switch includes an insulating arm 21 fixed on a shaft 22 for rotation therewith. The arm 21 carries three brushes 23. As the arm 21 rotates, the brushes 23 sequentially engage rows of contacts 24 supported by an annular insulating member, a portion of which is shown at 25. One row of contacts 24 is provided for each field station in the system. In the fragment of the station selecting apparatus shown in the drawings, contacts 24 are illustrated for field stations 567, 123, and 124.

Figure 1C:
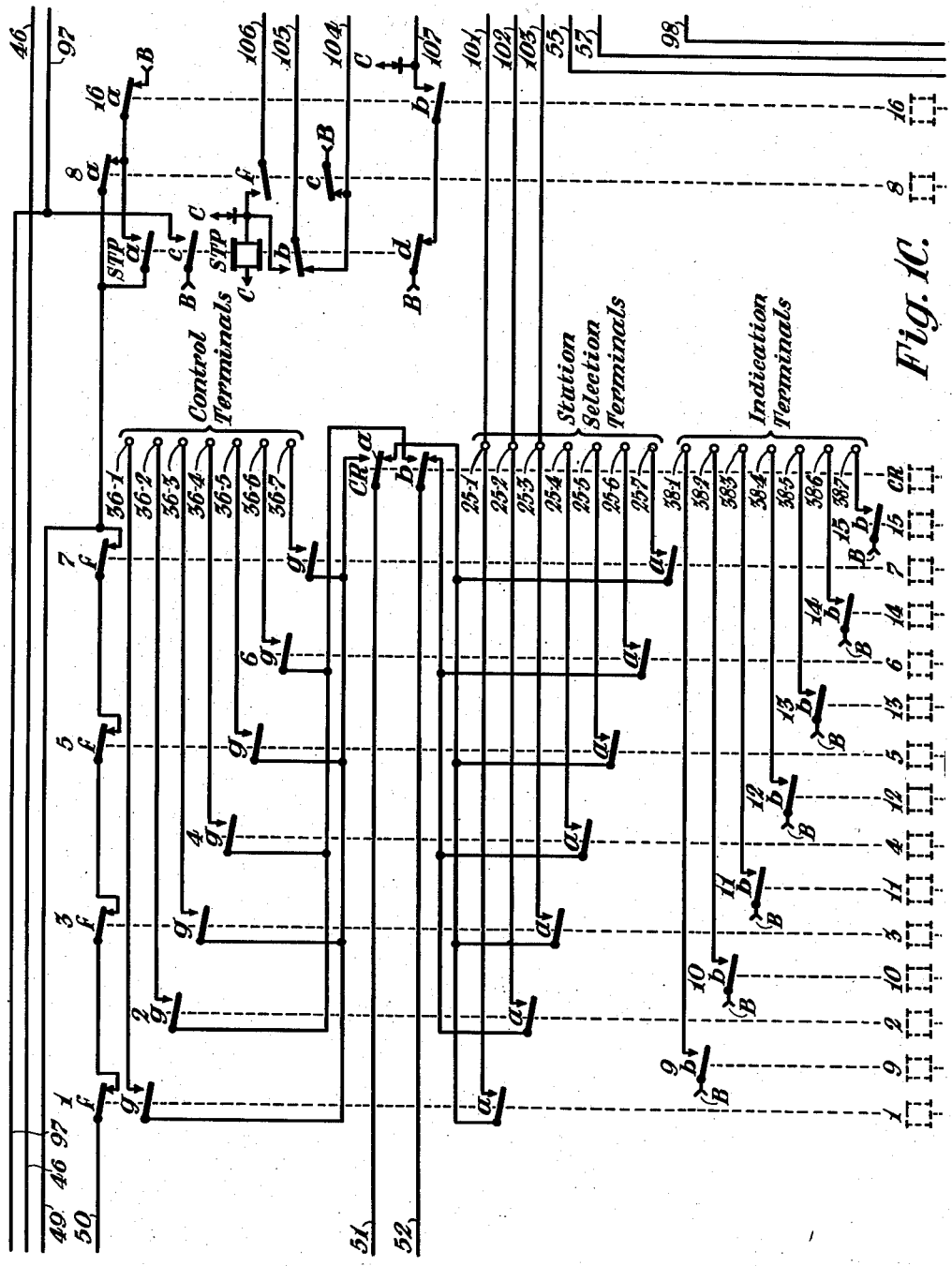
Figure 1D:
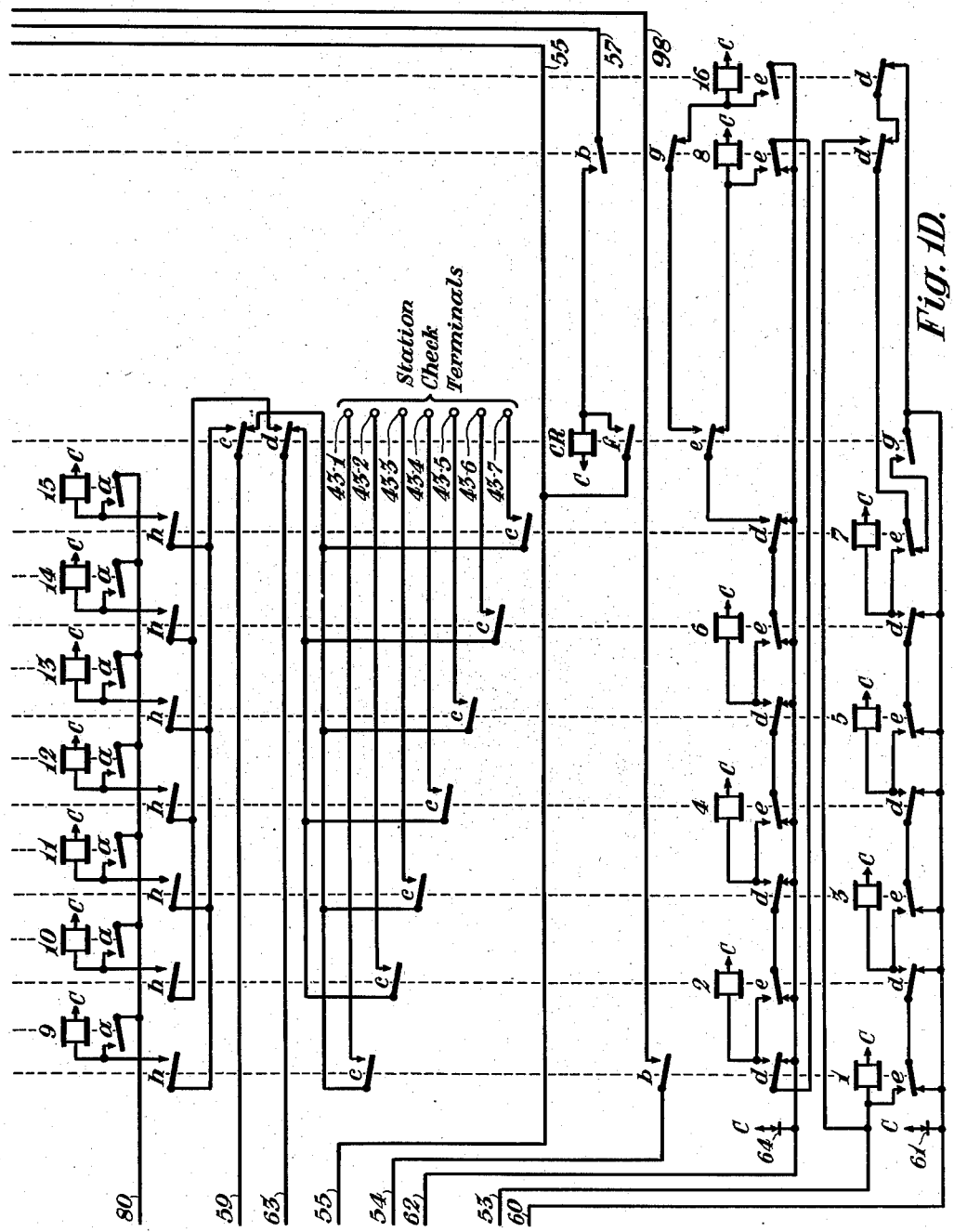
Figure 1E:
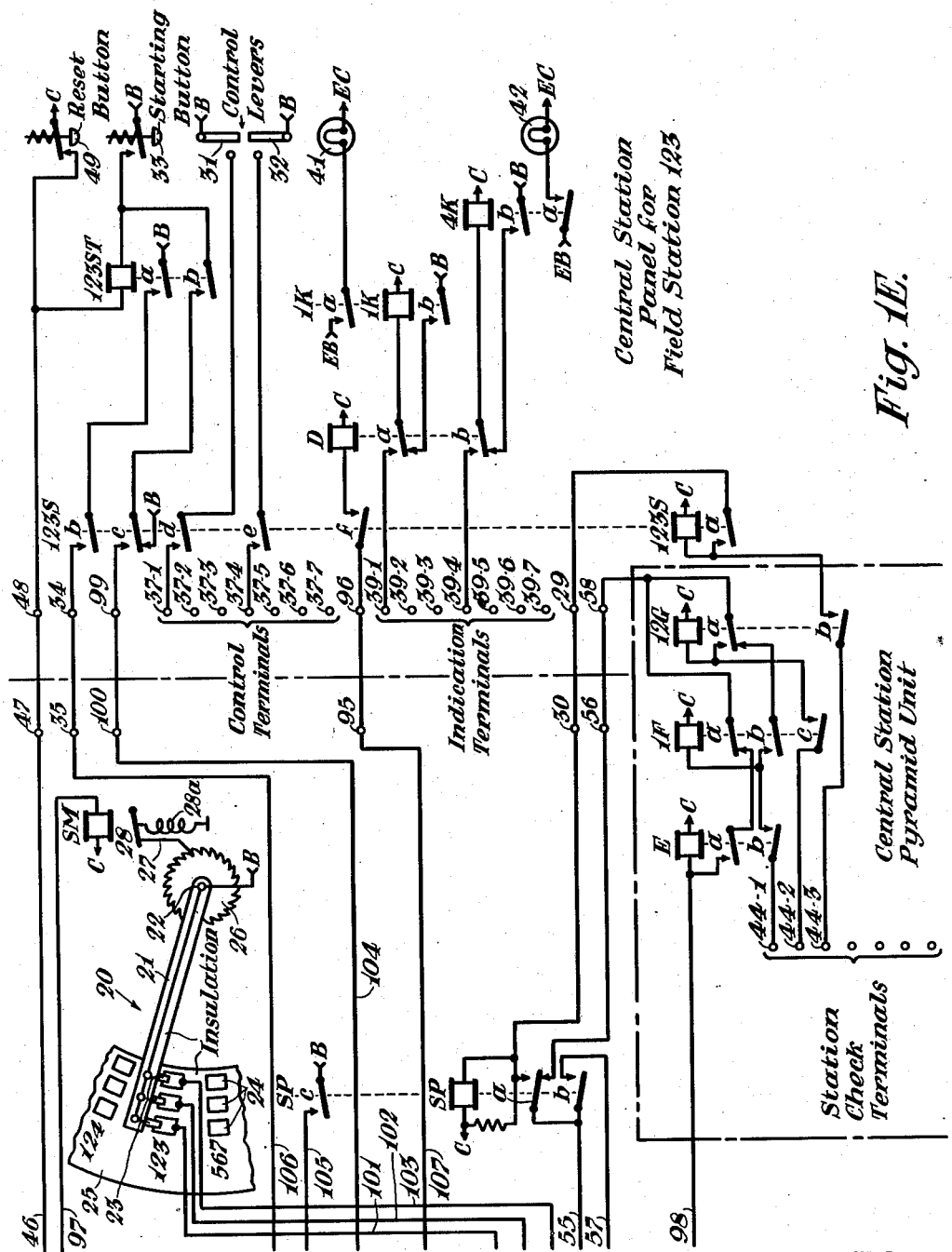

Each of the contacts 24 is connected to one of seven stations selection terminals numbered 25—1 to 25—7 (Fig. 1C). Only the connections for the contacts 24 associated with station 123 are shown in the drawings. It may be observed that the outer one of those three contacts 24 is connected by wire 101 to terminal 25—1, the middle contact 24 by wire 102 to terminal 25—2, and the innermost contact by wire 103 to terminal 25—3. The other connections have been omitted to avoid confusing the drawings.

The shaft 22 also carries a ratchet wheel 26, which is operated by a ratchet finger 27 attached to an armature 28 operated by an electromagnet SM. The electromagnet SM is energized each time the master relay M picks up, and remains energized until the sending of a code is completed. When the electromagnet SM is energized, the finger 27 moves freely over the sloping side of one of the teeth of the ratchet wheel 26, and does not turn the shaft 22. When the electromagnet SM is deenergized, the biasing spring 28a associated with armature 28 moves the finger 27 downwardly, thereby rotating the shaft 22 and arm 21 far enough to move the brushes 23 to the next set of contacts 24 corresponding to the next field station to be called.

The three brushes 23 are electrically connected together and to the battery terminal B, as indicated in the drawings. The sequence switch 20 is therefore effective in any given angular position to connect three selected station selection terminals 25 to the battery terminal B. In the position of arm 21 shown in the drawings, the terminals 25—1, 25—2, and 25—3 are so connected. These connections cause the first, second, and third steps of the code to be made long, in a manner to be described more completely hereinafter. When the first, second, and third steps are so selected, the apparatus at field station 123 responds in a manner to be described later. Thus it may be seen that the station selection apparatus including the sequence switch 20 causes the central station to call first one field station and then another, in a sequence determined by the connections between the station selection terminals 25 and the contacts 24, and that this sequence is endlessly repeated.

During the station selecting portion of a code, the central station is always transmitting, and so the transmitter T controls the receiver relay R. The relay R then controls the energization of station selection checking relays, commonly called pyramid relays, a group of which is shown in the pyramid unit at the bottom of Fig. 1E, and identified as relays E, 1F, and 12G.

Relay E is termed the pyramid entry relay. There is only one relay E. The E relay is energized on the first step of every code, regardless of whether that step is short or long. A number of F relays are provided, corresponding to the number of initial digits which appear in the station selecting codes. For example, in a system of the type shown, three code steps are used for each station code call and there are seven station selecting code steps available. Consequently, station code calls may begin with any digit from 1 to 5. Consequently, there may be, in such a system, as many as five F relays, numbered 1F, 2F, 3F, 4F, and 5F. Only relay 1F is shown in the drawings.

In a complete system, a number of G relays are provided corresponding to the number of combinations of two digits with which the code calls may begin. In the present system, up to fifteen digit combinations may be used, and a corresponding number of G relays may be required. Only relay 12G is shown in the drawings.

A station relay 123S is provided for each central station panel corresponding to a field station. In the system shown, up to thirty-five field stations may be used with one central station. The central station has one panel for each field station, similar to the panel for station 123 shown in Fig. 1E. Each field station panel at the central station has its own S relay such as 123S.

Each of the several station relays such as 123S is provided with a front contact a which controls an energizing circuit for a station repeater relay SP located in the central station coding unit. A portion of this circuit may be traced from contact a of relay 123S over a terminal 29 of a panel for station 123 and a terminal 30 of the central station coding unit to the winding of relay SP. It should be understood that terminal 30 is similarly connected to terminals equivalent to terminals 29 on all the other field station panels in the central station.

Each field station panel at the central station is provided with one or more control levers, such as those shown diagrammatically at 31 and 32 in Fig. 1B. These control levers are provided for the purpose of controlling corresponding functions at the field stations. After a control lever, such as 31, has been set to a position corresponding to a function desired to be performed at the field station, then a starting button 33 on the central station panel must be depressed momentarily in order to cause the transmission of a control code to the field station corresponding to the new position of the control lever 31. The starting button 33 controls an obvious energizing circuit for a starting relay 123ST, one of which is provided on each central office panel.

Each of the starting relays such as 123ST is provided with a front contact a which cooperates with a front contact b of the associated station relay 123S to complete an energizing circuit for a repeater relay STP located on the central station coding unit. This circuit may be traced over a terminal 34 on the field station panel and a terminal 35 on the central station coding unit. It will be understood that terminal 35 is similarly connected to terminals which are the counterparts of terminal 34 on each of the other field station panels at the central station.

Wherever a terminal on the central station coding unit, such as terminal 35, for example, is illustrated as being connected to a terminal, such as 34, on the panel for station 123, it should be understood that a similar connection exists between that coding unit terminal and counterpart terminals on all the other panels. Similar connections are intended in the case of groups of terminals, such as the control terminals 36 on the coding unit and the control terminals 37 on the panel, where the actual connections between terminals 36 and 37 are not shown on the drawings, but are indicated by the use of corresponding legends.

Each of the control terminals 37 on the field station panel is connected to one of the control levers. In the case of the panel for field station 123, only two such connections are shown, since the panel has only the two control levers 31 and 32.

The central office coding unit is also provided with a set of indication terminals 38 connected to indication terminals 39 on the various field station panels at the central station. The respective indication terminals 39 are connected to indication stick relays, such as those illustrated at 1K and 4K. These relays control energizing circuits for indicator lamps 41 and 42, respectively.

The energizing circuits for the ST and S relays include a similar arrangement of station check terminals 43 on the central station coding unit which are connected to station check terminals 44 on the central station pyramid unit. Since there is only one pyramid unit at the central station, only one terminal 44 is connected to each of the terminals 43.

The panel for each field station includes a reset button 49 which has a normally closed contact in the stick circuit for relay 123ST. The reset button 49 may be used to countermand the pushing of the starting button 33, in case it is desired to prevent the sending of a code to station 123.

Field station equipment

Most of the elements of field station equipment shown in Figs. 2A to 2D are the counterparts of corresponding elements at the central station. These field station elements have been given the same reference characters as their central station counterparts, preceded by the reference letter F. In the case of the station selection relay S, the numerical prefix of its central station counterpart has been dropped instead of adding the prefix letter F.

The field station starting relay FST is controlled in a manner somewhat different from the central station starting relays such as 123ST. The winding of relay FST is shunted by a choke coil 45 so as to make the relay FST quick releasing. Relay FST is provided with a pickup circuit which energizes it whenever a code is transmitted by the field station, and a stick circuit which maintains it energized until a contact a of a function repeating relay such as 1R, changes its position. A number of such function repeating relays may be provided at the field station. When any one of those relays changes its position, the starting relay FST is deenergized and causes the field station to respond to the next receipt of its station call signal by transmitting a code which indicates the position of all the function repeating relays. This code is effective at the central station to position the indication relays such as 1K to correspond to the position of their respective function repeating relays at the field station.

The field delivery relay FD is picked up after the eighth step of a code, providing the eighth step is of a length indicating that a control code for the field station is to follow. When relay FD picks up, it places a pair of impulse registry relays 1A and 2A under the control of the following code steps, so that relay 1A is picked up whenever a long odd-numbered code step is received and relay 2A is picked up whenever a long even-numbered code step is received. The impulse registry relays 1A and 2A, together with the counting chain relays 1 to 7, control energizing circuits for a number of function control relays, two of which are shown at 1SR and 4SR. The function control relays are energized or deenergized depending upon whether their respective steps of the code are made long or short.

Operation

Having generally described the central station equipment and the field station equipment, I will now describe three different typical operations which occur during the functioning of this system.

The first operation to be described comprises the sending of a station selecting code only by the central station and the receipt of that code by the field station. In this operation the station selecting code will not be followed by a control code transmitted from the central station to the field station nor will it be followed by an indication code transmitted from the field station to the central station.

The second operation to be described will comprise the sending of a station selection code by the office, followed by a control code, and the receipt of that station selecting code and control code by the field station.

The third operation to be described comprises the sending of a field station selecting code by the office followed by the transmission of an indication code from the field station to the central station.

These three operations will completely illustrate the functioning of my control system. While particular codes may produce the selection of different field stations or the performance of different control or indicating functions, nevertheless the operations to be described are typical of all operations of the system.

In the description that follows, it is considered that each code step begins with the picking up or dropping of the receiver relays R and FR at the central station and the field station, respectively, and that these code steps end when these relays change their position in the opposite sense.

*Office sending call signal only for station 123*

This call signal comprises a code of eight steps, the first, second, and third steps being long and the next four short. The eighth step is long, indicating that no control code is following from the office. Since no indication code is to follow from the field station, all transmission ceases after the eighth step.

Starting with the stepping switch and all the relays in the positions shown in the drawings, it may be seen that a pickup circuit is completed for master relay M. This circuit may be traced from battery terminal B in Fig. 1A over back contacts *a* of relays IL and 2L, thence through the winding of relay M and through wire 46, terminals 47 and 48, and the contact of the reset button 49 on the field station panel to the opposite battery terminal C. Energization of relay M causes it to close its front contacts. Front contact *a* of relay M connects antenna 17 to the output circuit of the radio transmitter 18. Front contacts *b* and *c* of relay M place the receiver relay R under the control of contacts *b* and *c* of the transmitter relay T. The central station is thus prepared to transmit a code. Contact *e* of relay M completes an obvious circuit over wire 97 for electromagnet SM of stepping switch 20. As previously mentioned, energization of electromagnet SM produces no action, but prepares the stepping switch 20 to move along to its next station selecting position when the electromagnet SM is deenergized. Contact *f* of relay M prepares a stick circuit for that relay which may be traced from battery terminal B (Fig. 1C) over back contact *a* of relay 16, back contact *a* of relay 8 in parallel with front contact *a* of relay STP, and thence over a conductor 49, front contact *a* of relay LB in parallel with front contact *f* of relay LBP, front contact *f* of relay M, through the winding of relay M and thence along the circuit previously traced, to battery terminal C. Relay M is made slow releasing by the connection of an asymmetric unit across the terminals of its winding, so that it can hold its contacts in their picked-up positions during the time between the picking up of relay IL which breaks the pickup circuit of relay M and the picking up of relay LB which completes its stick circuit, as described below.

Front contact *d* of relay M closes a pickup circuit for transmitter relay T which may be traced from battery terminal B (Fig. 1C) over back contact *a* of relay 16, back contact *a* of relay 8 in parallel with front contact *a* of relay STP, thence over back contacts *f* of relays 7, 5, 3, and 1, wire 50, front contact *d* of relay M, and thence through the winding of transmitter relay T and fixed resistances 51 and 52 to the opposite battery terminal C.

When relay T picks up, its front contact *a* completes the input circuit of radio transmitter 18, thereby initiating the transmission of an impulse to the field stations. At the same time, contacts *b* and *c* of transmitter relay T complete an obvious energizing circuit for receiver relay R, which picks up, thereby starting the reception at the office of the first step of the code.

Contact *d* of relay T prepares a number of parallel stick circuits for relay T, which may be effective to maintain energization of relay T during the long odd-numbered code steps. Two of these circuits may be traced from battery terminal B at stepping switch 20 (Fig. 1E), thence through brushes 23 and contacts 24, wires 101 and 103, terminals 25—1 and 25—3, front contacts *a* of relays 1 and 3, back contact *a* of relay CR, and thence through wire 51, front contact *d* of relay IL in parallel with front contact *a* of relay LP, over front contact *d* of relay T and thence through the winding of relay T and resistances 51 and 52 to the opposite battery terminal.

Front contact *e* of relay T shunts resistance 51 from the stick circuit of that relay. When back contact *e* of relay T is closed, it prepares a number of parallel hold-down circuits for relay T which may be selectively closed during the long even-numbered code steps. One of these hold-down circuits may be traced from terminal B at sequence switch 20 through the center brush 23, contact 24, wire 102, terminal 25—2, front contact *a* of relay 2, back contact *b* of relay CR, conductor 52, front contact *f* of relay 2L in parallel with front contact *c* of relay LP, over back contact *e* of relay T and through resistances 51 and 52 to the opposite battery terminal C. When any of these hold-down circuits is completed, the winding of relay T is effectively shunted, and cannot be picked up by completion of its pickup circuit.

*First code step.*—When relay R picks up to initiate the first code step, its front contact *a* completes a pickup circuit for slow release relay IL in the timing relay chain. This circuit may be traced from battery terminal B (Fig. 1B) over front contact *a* of relay R, back contact *b* of relay 2L, back contact *a* of relay LBP, and the winding of relay IL to the opposite battery terminal C. When relay IL picks up, its back contact *a* opens the pickup circuit for master relay M which nevertheless remains up due to its slow releasing characteristics until its stick circuit, previously traced, is completed. When relay IL picks up, its contact *b* completes a pickup circuit for counting chain relay 1, and its contact *c* completes a pickup circuit for the slow release relay 2L.

The pickup circuit for relay 1 may be traced from battery terminal B over front contact *b* of relay R, back contact *b* of relay LBP, front contact *b* of relay IL, wire 53, and through the winding of relay 1 to the opposite battery terminal C. Picking up of relay 1 completes a pickup circuit for pyramid entry relay E, which may be traced from battery terminal B (Fig. 1B) over back contact *c* of relay LBP, wire 54, contact *b* of relay 1, wire 98, and the winding of relay E to battery terminal C. The picking up of relay 1 also completes over its front contact a and front contact d of relay 1L the previously traced stick circuit for transmitter relay T. Relay T now remains energized until this stick circuit is broken. Hence, this stick circuit determines the length of the first code step.

When relay 2L picks up due to the closing of its previously traced pickup circuit over front contact b of relay 1L, back contact b of relay 2L opens the pickup circuit for relay 1L. Relay 1L continues to hold its contacts up for a time because of its slow releasing characteristics. When relay 2L picks up, it completes its own stick circuit at its front contact c. It also completes a circuit for relay LP over front contact e of relay 1L and front contact d of relay 2L. When relay LP picks up, it closes its front contact a in parallel with front contact d of relay 1L in the stick circuit for transmitter relay T. This insures that the energization of relay T and hence the first code step will continue until both relays 1L and LP are deenergized. Front contact b of relay LP closes an obvious pickup circuit for relay LB, and another obvious pickup circuit for relay LBP which extends over back contact a of relay LB. When relay LB picks up, this original energizing circuit for relay LBP is replaced by one over front contact a of relay LB.

Picking up of relay LBP opens the previously traced pickup circuit for relay E at back contact c of relay LBP. However, the same action also completes a stick circuit for relay E which may be traced from battery terminal B (Fig. 1B) over front contact c of relay LBP, wire 55, back contact a of relay SP, terminal 56, terminal 52, back contact a of relay 1F, front contact a of relay E, and through the winding of relay E to the opposite battery terminal C.

When relay LBP picks up, its back contact b breaks the previously traced pickup circuit for counting chain relay 1, but its front contact b establishes a stick circuit for relay 1. This stick circuit may be traced from battery terminal B (Fig. 1B) over front contact b of relay R, front contact b of relay LBP, wire 60, back contact d of relay 2, front contact e of relay 1, and through the winding of relay 1 to battery terminal C.

Relay 1L now drops as a result of its previous deenergization when relay 2L picked up, and its back contact f completes a pickup circuit for relay 1F. This circuit may be traced from battery terminal B (Fig. 1B) over front contact e of relay LBP, back contact f of relay 1L, conductor 59, back contact c of relay CR, front contact c of counting chain relay 1, terminals 43—1 (Fig. 1D) and 44—1 (Fig. 1E), front contact b of relay E, and thence through the winding of relay 1F to the opposite battery terminal C. Relay 1F picks up and closes its own stick circuit at its front contact b. This stick circuit may be traced from battery terminal B (Fig. 1B) over front contact c of relay LBP, wire 55, back contact a of relay SP, terminal 56, terminal 58, back contact a of relay 12G, front contact b of relay 1F and through the winding of relay 1F to battery terminal C. Relay 1F in picking up also opens its back contact a, thereby breaking the stick circuit for relay E, which drops, and breaks the pickup circuit just traced for relay 1F.

When relay 1L dropped, it opened the energizing circuit for relay LP which, however, held its contacts up because of its slow releasing characteristics, which are designed to be long enough to maintain the contacts of relay LP up until after the stick circuit for relay 1F, just traced, has been established. Thereafter, relay LP releases its contacts, and its front contact a breaks the previously traced stick circuit for transmitter relay T. Transmitter relay T thereupon releases its contacts, opening the radio transmitter input circuit at its front contact a and opening the energizing circuit of relay R at its front contacts b and c. Relay R drops, terminating the impulse which constitutes the first step of the code, and starting the interval which constitutes the second step of the code.

*Second code step.*—When relay R drops to start the second code step, its front contact a breaks the stick circuit for relay 2L, and its front contact b opens the stick circuit for counting relay 1. At the same time, back contact c of relay R closes a pickup circuit for relay 1L, and back contact d of relay R closes a pickup circuit for counting relay 2. Relay 2L continues to hold its contacts up because of the slow releasing characteristics imparted by the asymmetric unit connected across the terminals of its winding. Relay 1 continues to hold its contacts up until its stick circuit is opened at back contact d of relay 2, due to the slow releasing characteristics imparted by asymmetric unit 61 connected between wire 60 and battery terminal C.

The circuit over which relay 1L is picked up on the second code step may be traced from battery terminal B (Fig. 1B) over back contact c of relay R, front contact e of relay 2L in parallel with front contact a of relay LBP; and thence through the winding of relay 1L to battery terminal C. Picking up of relay 1L again completes the pickup circuit for relay LP over front contact e of relay 1L and front contact d of relay 2L.

The pickup circuit for relay 2 may be traced over back contact d of relay R, front contact d of relay LBP, wire 62, back contact e of counting relay 8, front contact d of relay 1, and thence through the winding of relay 2 to battery terminal C. Relay 2 completes its stick circuit over its contact e and back contact d of relay 3. Relay 2 in picking up closes at its front contact a one of the hold-down circuits for transmitter relay T, previously traced. It will be remembered that this circuit extends from positive battery terminal B at stepping switch 20 over wire 102, terminal 25—2, contact a of relay 2, back contact b of relay CR, wire 52, front contact f of relay 2L in parallel with front contact c of relay LP, and over back contact e of relay T to the negative terminal of its winding. This circuit applies the positive battery terminal to the normally negative terminal of the winding of relay T, and prevents that relay from picking up even when its pickup circuit is completed. This stick-down circuit insures that relay T remains down until relays 2L and LP both drop their contacts to open the hold-down circuit.

Relay 2 in picking up opens at its back contact d the connection by which asymmetric unit 61 was connected across the terminals of the winding of relay 1, so that relay 1 immediately drops. The dropping of relay 1 completes at its back contact f the pickup circuit for transmitter relay T, but this circuit is at present ineffective because of the hold-down circuit for that relay, just traced.

Relay 2L, having been deenergized when relay R dropped, now releases its contacts, thereby opening the circuit for relay LP and closing a pickup circuit for relay 12G. Relay LP continues to hold its contacts up because of its slow releasing characteristics. The pickup circuit for relay 12G may be traced from battery terminal B (Fig. 1B) over front contact *c* of relay LBP, back contact *g* of relay 2L, wire 63, back contact *d* of relay CR, front contact *c* of relay 2, terminal 43—2 (Fig. 1D), terminal 44—2 (Fig. 1E), front contact *c* of relay IF, and thence through the winding of relay I2G to battery terminal C. Relay I2G in picking up opens the previously traced stick circuit for relay IF at its back contact *a*, and closes its own stick circuit at its front contact *a*. This stick circuit for relay I2G follows the previously traced stick circuit for relay IF to front contact *a* of relay I2G, and thence passes through the winding of relay I2G to battery terminal C.

Relay LP, having been deenergized when relay 2L dropped, now releases its contacts, thereby opening at its contact *c* the hold-down circuit previously traced for transmitter relay T. The pickup circuit for relay T through back contact *f* of counting relay I then becomes effective to energize relay T, which picks up, thereby energizing relay R which likewise picks up. The code interval which constituted the second step is thereby terminated and the code impulse which constitutes the third code step is started.

*Third code step.*—When relay R picks up, its back contact *c* opens the circuit for relay IL and its back contact *d* opens the stick circuit for relay 2. Relay IL continues to hold its contacts up because of its slow releasing characteristics. Relay 2 also continues to hold its contacts up because of the slow releasing characteristics imparted to it by the rectifier 64 which is connected across the terminals of relay 2 through its front contact *e* and back contact *d* of relay 3. When relay R picks up, its front contact *a* completes the pickup circuit for relay 2L, which also extends over front contact *c* of relay IL. At the same time, front contact *b* of relay R completes a pickup circuit for relay 3, which may be traced over front contact *b* of relay R, front contact *b* of relay LBP, wire 60, back contact *e* of relay I, front contact *d* of relay 2, and thence through the winding of relay 3 to battery terminal C. Relay 3 completes its stick circuit over its contact *e* and back contact *d* of relay 4.

When relay 2L picks up, it completes the circuit for relay LP, previously traced. Relay LP thereupon picks up its contacts.

When relay 3 picks up, its back contact *d* opens the connection by which asymmetric unit 61 was connected across the terminals of the winding of relay 2, so that relay 2 then quickly releases its contacts.

Relay 3 in picking up opens the pickup circuit for relay T at back contact *f* of relay 3. However, front contact *a* of relay 3 completes a stick circuit for relay T, previously traced, over front contact *d* of relay IL and front contact *a* of relay LP in parallel, almost immediately after the pickup circuit for relay T is broken. Relay T is made sufficiently slow releasing so as to bridge the gap between the time when its pickup circuit is opened and its stick circuit is closed, and therefore holds its contacts up during this interval. Relay T is now stuck up, and cannot release its contacts until both relays IL and LP release their contacts.

Relay IL, having been deenergized when relay R picked up, now releases its contacts, thereby opening the circuit of relay LP, which continues to hold its contacts up because of its slow releasing characteristics. When relay IL releases its contacts, its back contact *f* completes an energizing circuit for relay I23S. This circuit may be traced from battery terminal B (Fig. 1B) over front contact *c* of relay LBP, back contact *f* of relay IL, conductor 59, back contact *c* of relay CR, front contact *c* of relay 3, terminal 43—3, terminal 44—3, front contact *b* of relay I2G, and thence through the winding of relay I23S to battery terminal C.

Relay I23S in picking up closes at its front contact *a* an energizing circuit for relay SP. This circuit may be followed along the circuit just traced for relay I23S and thence over front contact *a* of that relay, terminals 29 and 30, through the winding of relay SP to battery terminal C. When relay SP picks up, its front contact *a* opens the stick circuit previously traced for relay I2G and completes stick circuits for relays SP and I23S. These stick circuits may be traced from battery terminal B (Fig. 1B) over front contact *c* of relay LBP, through wire 55, front contact *a* of relay SP, and thence either through winding of relay SP to battery terminal C or through terminals 30 and 29, over front contact *a* of relay I23S, and thence through the winding of that relay to battery terminal C.

Relay LP, having been deenergized when relay IL released its contacts, now releases its contacts in turn, and its front contact *a* opens the stick circuit for transmitter relay T, which consequently drops. This deenergizes relay R which releases its contacts to terminate the impulse which constitutes the third step of the code and to start the interval which constitutes the fourth step.

*Fourth code step.*—When relay R drops, its front contact *a* opens the circuit for relay 2L, and its front contact *b* opens the circuit for relay 3. Both relays 2L and 3 continue to hold their contacts up because of their slow releasing characteristics. When relay R drops, its back contact *c* completes a circuit for relay IL, and its back contact *d* completes a pickup circuit for relay 4 which may be traced over back contact *e* of relay 2 and front contact *d* of relay 3. Relay 4 completes its stick circuit in a similar manner to the counting chain relays 2 and 3. The stick circuits for relays 4, 5, 6, and 7 will not be described in detail, as they are all believed to be obvious from the drawing.

When relay IL picks up, it completes the circuit for relay LP, which also picks up.

When relay 4 picks up, its back contact *d* opens the connection by which asymmetric unit 61 shunts the winding of relay 3, and relay 3 immediately drops. When relay 3 drops, its back contact *f* completes the energizing circuit for transmitter relay T. Since no hold-down circuit through sequence switch 20 and contact *a* of relay 4 is completed, this energizing circuit for transmitter relay T is immediately effective and it picks up relay T. Relay T in turn picks up relay R to terminate the interval which constituted the fourth step of the code and to start the impulse which constitutes the fifth step.

It should be noted that the fourth step was much shorter than the previous steps and was not dependent upon the release times of the relays IL, 2L, and LP. The release time of relay 2L is such that it has not released its contacts at the end of the fourth step, and consequently relay LP remains energized.

*Fifth code step.*—When relay R picks up, its back contact *c* opens the circuit for relay IL and its front contact *a* completes the circuit for relay 2L. Since relay 2L had not released its contacts at the end of the fourth step, it may be seen that the contacts of relay 2L, and likewise IL, remain up continuously as long as the code steps remain short. Consequently, relay LP remains energized as long as the code steps are short.

When relay R picks up at the beginning of the fifth step, its back contact d opens the circuit for relay 4 and its front contact b completes a circuit for relay 5. When relay 5 picks up, its back contact b opens and immediately drops relay 4. At the same time, back contact f of relay 5 opens the pickup circuit of transmitter relay T. Since no stick circuit for relay T is completed at this time through the sequence switch 20, relay T drops after a period of time determined by its slow releasing characteristics, thereby deenergizing relay R to terminate the fifth code step and start the sixth.

*Sixth code step.*—This step is like the fourth code step, except that the counting relay 5 is dropped and the counting relay 6 is picked up, as compared with the dropping of relay 3 and picking up of relay 4 on the fourth step.

*Seventh code step.*—This step is like the fifth step, except that counting relay 6 is dropped and counting relay 7 is picked up, as compared with the dropping of relay 4 and picking up of relay 5 on the fifth step.

*Eighth code step.*—When relay R drops at the beginning of this step, its back contact c recloses the circuit for relay 1L, thereby reenergizing it to hold its contacts up. Front contact a of relay R opens the circuit to relay 2L, which continues to hold its contacts up because of its slow releasing characteristics.

Opening of contact b of relay R opens the circuit to relay 7. Closure of back contact d of relay R completes a pickup circuit for relay 8, similar to the pickup circuits for relays 2, 4, and 6 except that it includes back contact e of chain repeat relay CR. When relay 8 picks up, its back contact d opens the connection by which asymmetric unit 61 is connected across the winding of relay 7, so that relay 7 then drops its contacts.

When relay 8 picks up, its front contact b completes a pickup circuit for the chain repeat relay CR which may be traced from battery terminal B (Fig. 1B) over front contact c of relay LBP, wire 55, front contact b of relay SP (Fig. 1E), wire 57, front contact b of relay 8, and the winding of relay CR to the battery terminal C.

When relay 8 picks up, its front contact a opens both the stick circuit of master relay M and the pickup circuit of transmitter relay T. Therefore transmitter relay T cannot pick up to continue transmission beyond the eighth step. The master relay M continues to hold its contacts up for a time determined by its slow releasing characteristics before it drops to transfer control of receiver relay R to the radio receiver 19.

At the beginning of this operation, it was assumed that no message was stored at the central station by energization of relays 123ST and STP and that no message was stored at the field station 123 which would cause it to transmit at this time.

Relay 2L, having been deenergized by the dropping of relay R at the beginning of the eighth step, now releases its contacts. Relays LP, LB, and LBP then release their contacts in order, each after a time determined by its own slow releasing characteristics.

When the LBP relay drops, its front contact d opens the circuit to relay 8, and its front contact c opens the circuit to relays 123S, SP, and CR. Contact a of relay LBP opens the circuit to relay 1L, but its contacts remain up for a time because of its slow releasing characteristics.

When relay M releases its contacts, its front contact e opens the circuit for electromagnet SM and the stepping switch 20, thereby deenergizing electromagnet SM and causing the pawl 27 to advance the ratchet wheel 26, thereby moving the arm 21 so that field station 124 will be selected when the central station transmits its next code.

When relay 1L drops, then all relays have been returned to their positions at the beginning of the codes just described, and as just mentioned, the stepping switch 20 has been advanced one step. When relay 1L drops, its contact a completes the pickup circuit for master relay M which picks up to start transmission of the call signal for the station 124, as selected by the stepping switch 20.

*Field station 123 receiving its call signal only*

We will now consider the operation of the field station equipment shown in Figs. 2A to 2D when receiving the station call signal whose transmission by the central station has just been described. It is assumed that the operation starts with all the relays in the positions shown in the drawings. Hence the radio receiver F19 has its input circuit connected to the antenna F17 over back contact f of relay FM, and its output circuit is connected to the field receiver relay FR over back contacts d and e of relay FM.

*First code step.*—Field receiver relay FR picks up as the first transmitted impulse from the central station begins, and remains up throughout the impulse. When relay FR picks up, its front contact a completes a pickup circuit for counting chain relay F1L. This circuit may be traced over front contact a of relay FR, back contact a of relay F2L, and back contact a of relay FLBP. When relay F1L picks up, its front contact a closes a pickup circuit for relay F1 of the counting chain. This circuit may be traced over front contact b of relay FR, back contact b of relay FLBP, front contact a of relay F1L, a resistance 65, a wire 66, and through the winding of relay F1 to the opposite battery terminal C.

Front contact b of relay F1L closes an obvious energizing circuit for relay F2L, which in turn closes its stick circuit over its own front contact b. Opening of back contact a of relay F2L breaks the circuit of relay F1L, which holds its contacts up due to its slow releasing characteristics.

Picking up of relay F2L completes a circuit for relay FLP over front contacts c of relays F1L and F2L. Picking up of front contact a of relay FLP completes a circuit for relay FLB and another circuit for relay FLBP which extends over back contact a of relay FLB. This last circuit is immediately replaced by another circuit over front contact a of relay FLB when the latter picks up.

When relay FLBP picks up, the pickup circuit previously traced for counting chain relay F1 is broken by the back contact b of relay FLBP. However, this pickup circuit is immediately replaced by a stick circuit for the same relay which may be traced over front contact b of relay FR, front contact b of relay FLBP, a resistance 67, wire 68, back contact a of counting chain relay F2, and front contact b of counting chain relay F1.

This first code step is longer than the release time of relay F1L, which, having been deenergized by the picking up of relay F2L, releases its contacts when its release time expires. Its back contact d then completes an energizing circuit for the first station selection relay F. This circuit may be traced from battery terminal B (Fig. 2B) over front contact c of relay FLBP, wire 69, back contact a of relay S, wire 70, back contact d of relay FIL, wire 71, back contact a of relay FCR, front contact c of relay FI, terminal 72—1, and thence through the winding of relay F to battery terminal C. Relay F picks up, closing at its front contact a its own stick circuit which may be traced from front contact c of relay FLBP over wire 69, back contact b of relay S, back contact a of relay G, and front contact a of relay F.

When the impulse which constitutes the first code step terminates, relay R drops, thereby marking the end of the first code step and the beginning of the second code step.

*Second code step.*—When relay FR drops, its front contact a opens the circuit to relay F2L, which nevertheless holds its contacts up because of its slow releasing characteristics. At the same time, front contact b of relay FR opens the circuit to counting chain relay FI, which continues to hold its contacts up because of the slow releasing characteristics imparted to it by asymmetric unit 73, which is connetced across the terminals of the winding relay FI over back contact a of relay F2 and front contact b of relay FI.

When relay FR drops, its back contact c completes a circuit for relay FIL, which may be traced over a front contact d of relay F2L in parallel with front contact a of relay FLPB.

Back contact d of relay FR completes a pickup circuit for counting chain relay F2, which may be traced from that contact over front contact d of relay FLPB, through resistance 74, a wire 75, and front contact a of relay FI, to the winding of relay F2. When relay F2 picks up, its back contact a opens the connection by which asymmetric unit 73 was connected across the terminals of relay FI, so that relay FI immediately drops its contacts.

Since this long code step is longer than the release time of relay F2L, which was deenergized at the beginning of the step, that relay now drops its contacts, and its back contact c completes a pickup circuit for station selecting relay G. This circuit may be traced from terminal B (Fig. 2B) over front contact c of relay FLBP, wire 69, back contact a of relay S, wire 70, back contact c of relay F2L, wire 76, back contact b of relay FCR, front contact c of relay F2, terminal 72—2, front contact b of relay F, and thence through the winding of relay G to the opposite battery terminal C. When relay G picks up, its contact a opens the stick circuit for relay F, previously traced, and completes a stick circuit for relay G, which follows the stick circuit previously traced for relay F as far as contact a of relay G.

Relay FLP, having been deenergized when relay F2L released its contacts, normally will not release its contacts before the end of the code step. If it does, its contacts have no effect during the receiving stage of the operation.

At the end of the second step, another impulse is received by the radio receiver F19, which picks up relay FR to terminate the second code step and start the third code step.

*Third code step.*—When relay FR picks up, its back contact c opens the circuit for relay FIL and its back contact d opens the circuit for counting chain relay F2. Both relays FIL and F2 continue to hold their contacts up because of their slow releasing characteristics. In the case of relay F2, this slow releasing characteristic is imparted by the asymmetric unit 77, which at this time is connected across the terminals of the winding of relay F2 over back contact d of relay F3 and front contact b of relay F2.

When relay FR picks up, its front contact a completes a circuit for relay F2L and its front contact b completes a circuit for counting chain relay F3. The last-mentioned circuit may be traced over front contact b of relay FLBP, resistance 67, wire 68, back contact b of relay FI, and front contact a of relay F2. When relay F3 picks up, its contact d breaks the connection between asymmetric unit 77 and the winding of relay F2, which therefore drops its contacts.

Since the third code step is longer than the release time of relay FIL, the latter drops its contacts, completing over its back contact d a pickup circuit for relay S. This circuit may be traced from battery terminal B over front contact c of relay FLBP, wire 69, back contact a of relay S, which is now bridged by front contact c of relay G, wire 70, back contact d of relay FIL, wire 71, back contact a of relay FCR, front contact c of relay F3, terminal 72—3, front contact b of relay G, and thence through the winding of relay S to the opposite battery terminal C. When relay S picks up, its contact b breaks the stick circuit for relay G and completes a stick circuit for relay S.

Relay S is provided with a pair of make-before-break contacts c and d. The normal stick circuit for field starting relay FST may be traced from battery terminal B over front contact b of relay FST, back contact c of relay S, the winding of relay FST and thence over contacts a of relays IR and 4R to the opposite battery terminal C. When relay S picks up, this back contact c is opened, but a substitute stick circuit is provided for relay FST which may be traced over front contact c of relay S, wire 78, front contact b of relay FLB in parallel with back contact e of relay FLBP, and back contact g of relay FM, wire 79, back contact a of field delivery relay FD, and front contact d of relay S to the winding of relay FST. This substitute stick circuit remains effective, due to the closing of back contact g of relay M, until relay S again drops, whereupon the normal stick circuit is reestablished.

When the impulse which constitutes the third code step terminates, relay FR drops to mark the start of the fourth code step.

*Fourth code step.*—When relay FR drops, its front contact a breaks the circuit for relay F2L, and its back contact c closes the circuit for relay FIL. At the same time, front contact b of relay FR opens the circuit for counting chain relay F3 and back contact d of relay FR closes the circuit for counting chain relay F4. Since the fourth code step is a short one, it is not as long as the release times of the relays FIL and F2L. Consequently, on each short code step, both these relays have their contacts picked up, one because it is energized and the other because of its slow releasing characteristics. No further action takes place before the end of the fourth step.

*Fifth code step.*—When relay FR picks up, its back contacts c and d open the circuits to relays FIL and F4, respectively. At the same time, its front contacts a and b complete circuits for relays F2L and F5, respectively.

*Sixth code step.*—This is similar to the fourth code step, except that relay F5 is dropped and relay F6 picked up, as compared to the dropping of relay F3 and picking up of relay F4 on the fourth step.

19

*Seventh code step.*—This is generally similar to the fifth code step, except that relay F6 is dropped and relay F7 picked up, as compared to the dropping of relay F4 and picking up of relay F5 on the fifth code step.

*Eighth code step.*—When relay FR drops, its front contact *a* opens the circuit for relay F2L and its front contact *b* opens the circuit for relay F7. At the same time, its back contact *c* completes a circuit for relay F1L and its back contact *d* completes a circuit for counting chain relay F8. The pickup circuit for relay F8 may be traced from back contact *d* of relay FR over front contact *d* of relay FLBP, resistance 74, wire 75, back contact *b* of relay F6, front contact *a* of relay F7, back contact *b* of relay FCR, to the winding of relay F8.

When relay F8 picks up, its front contact *b* completes a pickup circuit for relay FCR. This circuit may be traced over front contact *c* of relay FLBP, wire 69, front contact *a* of relay S, and front contact *c* of relay F8 to the winding of relay FCR. Front contact *d* of relay FCR completes its stick circuit over front contact *c* of relay FLBP.

The interval between impulses which constitutes the eighth code step is continued long enough by the central station to drop all the relays of its counting chain in sequence. Consequently, the counting chain relays at the field station also drop their contacts in sequence. Relay F2L, having been deenergized when relay FR dropped its contacts at the beginning of the eighth step, is the first to release, followed in succession by relays FLP, FLB, FLBP, and F1L. When relay FLBP drops, its front contact *c* breaks the stick circuit for relays S and FCR, and its front contact *d* breaks the circuit for relay F8. When these relays drop, all the relays and circuits at the field stations are returned to their normal positions, as shown in Figs. 2A and 2B.

*Operation with central station sending station call signal 123 followed by a control code*

In the following stage of operation of the system, it is assumed that the control levers 31 and 32 on the control panel for field station 123 (see Fig. 1C) have been moved to their circuit closing positions and that the starting button 33 has been pushed momentarily to pick up relay 123ST. Relay 123ST remains stuck up over its own front contact *b* and back contact *c* of relay 123S. The relays and the circuits at the central station are otherwise in the condition illustrated in Figs. 1A, 1B, and 1C.

The first seven steps of the code transmitted by the central station under these conditions are identical with the first seven steps described above when the field station was transmitting the station call signal only. Consequently, the description of these seven steps will not be repeated, but the description will start with the beginning of the eighth code step.

The new positions of the levers 31 and 32 will, as hereinafter explained in detail, cause the ninth and twelfth steps of the code to be made long. The other steps will be short, except that the sixteenth step will be long to reset all the apparatus at both the central station and the field station to its original condition.

The original stick circuit for relay 123ST, which extended to terminal B at back contact *c* of relay 123S, is replaced by another stick circuit when that relay picks up, which extends over front contact *c* of relay 123S, terminals 99 and 100, wire 104 and back contact *c* of relay 8, to terminal B. As soon as relay SP picks up in response to energization of relay 123S, another connection to terminal B for the stick circuit for relay 123ST is provided over front contact *c* of relay SP, wire 105, and back contact *b* of relay STP.

*Eighth code step.*—When relay R drops, its front contact *a* opens the circuit for relay 2L and its front contact *b* opens the circuit for counting chain relay 7. At the same time, back contact *c* of relay R closes a circuit for relay 1L and back contact *d* closes a circuit for relay 8.

Front contact *b* of relay 8 closes a pickup circuit for chain repeat relay CR, which circuit was previously traced in connection with the station calling code. Relay CR completes its stick circuit, also previously traced, over its front contact *f*.

When relay CR picks up, its contacts *a* and *b* transfer control of the stick and hold-down circuits for transmitter relay T from the contacts *a* of the several counting chain relays and the stepping switch 20 to the front contacts *g* of the several counting chain relays and the control levers 31 and 32 for station 123, which are connected to the counting relay contacts *g* through the terminals 37 and 36.

Front contact *f* of relay 8 completes a circuit for relay STP, which may be traced from battery terminal B (Fig. 1E) over front contact *a* of relay 123ST, front contact *b* of relay 123S, terminals 34 and 35, wire 106, and front contact *f* of relay 8 to the winding of relay STP, and thence to the opposite battery terminal B.

When relay STP picks up, its front contact *b* closes its stick circuit and its front contact *c* closes a stick circuit for electromagnet SM.

When relay 8 picks up, its back contact *c* opens one branch of the stick circuit for relay 123ST and when relay STP picks up, its back contact *b* breaks the last remaining branch of the stick circuit for relay 123ST. Relay 123ST therefore drops, and will not be picked up again until the starting button 33 is again operated.

When relay 8 picks up, its front contact *a* opens the circuit of master relay M, and also prevents completion of the pickup circuit of transmitter relay T when contact *f* of relay 7 closes. However, relay STP picks up soon after relay 8, as above described, and its front contact *a* shunts the open back contact *a* of relay 8, thereby again completing the circuit of master relay M and also completing the pickup circuit for transmitter relay T. The release time of master relay M is made long enough to bridge this short gap in the completion of its stick circuit.

When transmitter relay T picks up, it picks up relay R to terminate the eighth step of the code and start the impulse which constitutes the ninth step.

Relay T picks up before relay 2L releases, since its picking up is not delayed by any of the hold-down circuits. Hence the eighth code step is a short one under the conditions described.

*Ninth code step.*—When relay R picks up, its back contact *c* opens the circuit to relay 1L, and its back contact *d* opens the circuit to counting chain relay 8. At the same time, front contact *a* of relay R closes the circuit for relay 2L and front contact *b* of relay R closes a pickup circuit for counting chain relay 1.

When relay 1 picks up, its back contact *f* opens the pickup circuit for transmitter relay T, but its back contact *g* closes a stick circuit for relay T which includes front contact $d$ of relay IL and front contact $a$ of relay LP in parallel. This stick circuit for relay T may be traced from battery terminal B (Fig. 1E) over control lever 31, front contact $d$ of relay 123S, terminals 37—1 and 36—1 (Fig. 1C), front contact $g$ of relay 1, front contact $a$ of relay CR, wire 51, front contact $a$ of relay LP in parallel with front contact $d$ of relay IL, front contact $d$ of relay T, and thence through the winding of relay T to the opposite battery terminal C. This stick circuit is effective to keep the transmitter relay T energized until both relays IL and LP drop, and is thus effective to make the ninth code step long.

Relay IL, having been deenergized when relay R picked up, now releases its contacts. Its front contact $e$ opens the circuit of relay LP.

When back contact $f$ of relay IL closes, it completes a circuit for indication registry relay 9. This circuit may be traced from battery terminal B (Fig. 1B) over front contact $c$ of relay LBP, back contact $f$ of relay IL, wire 59, front contact $c$ of relay CR, front contact $h$ of relay 1, and thence through the winding of relay 9 to the opposite battery terminal C. Relay 9 in picking up completes its own stick circuit at its front contact $a$. This stick circuit for relay 9 may be traced over front contact $e$ of relay LBP, over wire 80 and the front contact $a$ of relay 9 to its winding, and thence to the opposite battery terminal C. The operation of relay 9 at this time is ineffective to produce any control or indication effect. It is mentioned here only to make the description of the operation complete.

Relay LP having been deenergized, now releases its contacts, and its front contact $a$ is effective to open the stick circuit for transmitter relay T, previously traced, which consequently drops, thereby dropping relay R to terminate the ninth code step.

*Tenth code step.*—When relay R drops, its front contact $a$ opens the circuit of relay 2L and its back contact $c$ closes the circuit for relay IL. Front contact $e$ of relay IL in turn closes the circuit for relay LP.

At the same time, front contact $b$ of relay R opens the circuit of relay 1 and back contact $d$ of relay R completes a circuit for relay 2. Relay 2, in picking up, immediately drops relay 1 and back contact $f$ of relay 1 completes the pickup circuit for transmitter relay T, which picks up, thereby picking up relay R to terminate the tenth step and start the eleventh.

Since the hold-down circuit for relay T is not completed, relay T picks up promptly when relay 1 drops, thereby making the tenth code step a short one.

*Eleventh code step.*—When relay R picks up, its front contact $a$ closes the circuit for relay 2L and its back contact $c$ opens the circuit for relay IL. At the same time, back contact $d$ of relay R opens the circuit of relay 2 and front contact $b$ of relay R closes the circuit for relay 3. When relay 3 picks up, its back contact $f$ opens the circuit of transmitter relay T, which releases its contacts, thereby dropping relay R. This terminates the eleventh code step and starts the twelfth.

*Twelfth code step.*—When relay R drops, its front contact $a$ opens the circuit of relay 2L and its back contact $c$ completes the circuit for relay IL. At the same time, its front contact $b$ opens the circuit of relay 3 and its back contact $d$ closes the circuit of relay 4.

When relay 4 picks up, it completes over its front contact $g$ a hold-down circuit for transmitter relay T. This hold-down circuit may be traced from battery terminal B (Fig. 1E) over control lever 32, front contact $e$ of relay 123S, terminals 37—4 and 36—4 (Fig. 1C), front contact $g$ of relay 4, front contact $b$ of relay CR, wire 52, front contact $c$ of relay LP in parallel with front contact $f$ of relay 2L, back contact $e$ of relay T, and thence through resistances 51 and 52 to the opposite battery terminal C. This hold-down circuit remains completed until both relays 2L and LP release their contacts, and thereby insures that the twelfth code step is long.

Relay 2L, having been deenergized when relay R dropped, releases its contacts, thereby opening the circuit for relay LP. At the same time, back contact $g$ of relay 2L completes an energizing circuit for indication registry relay 12. This circuit may be traced over front contact $c$ of relay LBP, back contact $g$ of relay 2L, wire 63, front contact $d$ of relay CR, front contact $h$ of relay 4, and thence through the winding of relay 12 to battery terminal C. Relay 12 in picking up completes its own stick circuit over its front contact $a$ similar to the stick circuit of registry relay 9. As in the case of relay 9, relay 12 performs no indicating or control function during this phase of the system operation.

Relay LP, having been deenergized when relay 2L released its contacts, now drops, opening the hold-down circuit for transmitter relay T, which picks up, in turn picking up relay R to terminate the twelfth code step and start the thirteenth.

*Thirteenth, fourteenth, and fifteenth code steps.*—The thirteenth and fifteenth code steps are generally similar to the other short odd-numbered steps, such as the eleventh. The fourteenth step is similar to the other even-numbered short steps, such as the tenth. It is believed that any further detailed description is unnecessary.

*Sixteenth code step.*—When relay R drops, it opens the circuit of relay 2L at its front contact $a$ and closes the circuit of relay IL at its back contact $c$. At the same time, front contact $b$ of relay R opens the circuit of relay 7 and back contact $d$ of relay R completes a pickup circuit for counting chain relay 16. This circuit may be traced over back contact $d$ of relay R, front contact $d$ of relay LBP, wire 62, back contact $e$ of relay 6, front contact $d$ of relay 7, front contact $e$ of relay CR, back contact $g$ of relay 8, and thence through the winding of relay 16.

When relay 16 picks up, it closes its own stick circuit at it front contact $e$, and its front contact $a$ opens the stick circuit of master relay M and the pickup circuit of transmitter relay T. Relay 2L, having been deenergized at the beginning of the sixteenth step, now drops, and the relays LP, LB, and LBP of the timing chain drop in their turn. When relay LBP drops, its front contact $a$ opens the circuit of relay IL, whose contacts remain up because of its slow releasing characteristics.

When relay LBP drops, its front contact $e$ opens the stick circuits for registry relays 9 and 12, and its front contact $c$ opens the stick circuits for relays CR, 123S, and SP, so that each of these relays releases. When relay SP drops, its front contact $c$ opens the stick circuit for relay STP, and as the latter relay drops its front contact $c$ opens the stick circuit for electromagnet SM of the stepping switch 20. As previously described, this causes the arm 21 to advance one step so that the central station will call the next field station in the predetermined sequence as soon as transmission starts again.

All relays are now in their normal positions except relay IL. When it drops, its back contact a completes the pickup circuit for master relay M, and the station starts sending the station calling signal of the next station selected by the stepping switch 20.

*Field station receiving a control code*

In the following, it will be assumed that the control code received by the field station equipment is the one the transmission of which has just been described. In this connection, it should be remembered that a control code transmitted from the central station takes preference over an indication code stored at the field station, and the field station receiving operations are the same whether or not it has an indication stored for transmission. If it has a message stored for transmission, it will remain stored until the field station is again called by the central station.

The first seven steps of this code are the same as described under the heading "Field station 123 receiving its call signal only" above, and will not be repeated here.

*Eighth code step.*—When relay FR drops at the beginning of this step, its front contact a opens the circuit for relay F2L and its back contact c closes the circuit for relay F1L. At the same time, front contact b of relay FR opens the circuit for counting chain relay F7 and back contact d of relay FR closes the circuit for counting chain relay F8.

When relay F8 picks up, its front contact c completes a pickup circuit for chain repeat relay FCR, previously traced. Picking up of relay FCR causes its contacts a and b to transfer the wires 71 and 76 from their connections with contacts c of the counting chain relays to impulse registry relays 1A and 2A which are associated with the contacts d of the counting chain relays in control of control relays such as that shown at 1SR.

Since the eighth code step is a short one, relay F2L remains up throughout its length, until the radio receiver F19 responds to the next impulse transmitted by the central station, picking up relay FR to terminate the eighth step and start the ninth.

*Ninth code step.*—When relay FR picks up, its front contact a closes a circuit for relay F2L, and its back contact c opens the circuit for relay F1L. At the same time, back contact d of relay FR opens the circuit for relay F8 and front contact b of relay FR closes a pickup circuit for relay F1. This pickup circuit for relay F1 may be traced over front contact b of relay FR, front contact b of relay FLBP, resistance 67, wire 68, front contact e of relay FCR, back contact b of relay F7, and then over front contact a of relay F8 to the winding of relay F1.

When relay F8 drops, its back contact d completes a pickup circuit for relay FD. This circuit may be traced from battery terminal B (Fig. 2A) over back contact a of relay FM, wire 81, front contact g of relay FCR, back contact d of relay F8, back contact c of relay F16, and thence through the winding of relay FD to the opposite battery terminal C.

Since the ninth impulse is made longer than the release time of relay F1L, which was deenergized at the beginning of the ninth step, relay F1L releases its contacts, thereby completing at its back contact d an energizing circuit for impulse registry relay 1A. This circuit may be traced from battery terminal B (Fig. 2B) over front contact c of relay FLBP, wire 69, front contact b of delivery relay FD, wire 70, back contact d of relay F1L, wire 71, front contact a of relay FCR, and thence through the upper winding of relay 1A to battery terminal C.

Contacts a and b of relay 1A govern the polarity of current supplied to relay 1SR through a circuit which is completed at the start of the tenth step. When relay 1A picks up, its front contact c prepares a stick circuit which is also completed at the start of the tenth step and continuous to hold relay 1A energized through the tenth step.

No further action takes place until the end of the ninth step, which is marked by the dropping of relay FR.

*Tenth code step.*—When relay FR drops, its front contact a opens the circuit of relay F2L, and its back contact c closes the circuit of relay F1L. At the same time, front contact b of relay FR opens the circuit of counting chain relay F1, and back contact d closes the circuit of relay F2.

Back contact d of relay FR also completes a circuit for the upper winding of control relay 1SR, and a stick circuit for relay 1A. The circuit for control relay 1SR may be traced from battery terminal B (Fig. 2B) over back contact d of relay FR, front contact d of relay FLBP, wire 82, front contact c of delivery relay FD, front contact a of relay 1A, front contact d of relay F1, control terminal 83—1, the upper winding of control stick relay 1SR, control terminal 84, and front contact b of relay 1A, to battery terminal C. It may be seen that relay 1SR is always energized at the start of the tenth step of a control code, but that the polarity of its energization is determined by the length of the ninth step. If the ninth step is long, as is the present one, relay 1A is energized and relay 1SR receives current of normal polarity. If the ninth step is short, relay 1A is not energized, and relay 1SR receives current of reverse polarity. Relay 1SR is of the polar stick type. That is, when energized with current of one polarity it moves its contacts to one position and when energized with current of the opposite polarity, it moves its contacts to the opposite position. Its contacts remain in any position to which they are actuated until its winding receives a current impulse of the opposite polarity. It may be seen that relay 1SR at the field station always repeats the position of control lever 31 at the central station. If the contact of control lever 31 is opened, then when a code is next transmitted to the field station, the ninth step is short and the relay 1SR is energized with current of one polarity. If the contact of lever 31 is closed, then upon transmission of the next code, the ninth step is long and relay 1SR is energized with current of the opposite polarity. Control lever 31 may therefore be used for the remote control of the device which is controlled by stick relay 1SR.

Although I have shown an arrangement wherein the control relays such as 1SR receive current of one or the other polarity with each code received by the field station, it should be understood that this arrangement can be readily replaced by one in which the control relays either receive current of a given polarity or do not receive current, depending upon whether the code step which controls them is long or short.

The stick circuit for relay 1A may be traced along the circuit just traced for relay 1SR as far as contact c of relay FD. After passing over that contact, this stick circuit may be traced over front contact c of relay 1A and thence through its lower winding to the opposite battery terminal C. This circuit remains completed throughout the tenth code step.

When relay F2 picks up at the beginning of the tenth step, it opens the slow release connection for relay F1, which drops, thereby opening at its front contact d the circuit for relay 1SR. Hence relay 1SR is energized only for a short period at the beginning of the tenth step, prior to the dropping of relay F1.

Since the tenth step is a short one, relay 2A is not picked up, and hence if a relay 2SR corresponding to 1SR were provided, it would be energized with current of normal polarity during the eleventh step.

*Eleventh code step.*—This step is short, and similar to the previously described short steps. On the eleventh step, relay F3 is picked up and relay F2 dropped. Since the step is short, relay 2A is not picked up, so that if a control relay 3SR corresponding to control relay 1SR were provided, it would be energized with current of normal polarity during the twelfth step.

*Twelfth code step.*—This step is made long by the closing of the contact on control lever 32 on the field station panel at the central station. At the beginning of this step, relay F4 is picked up and relay F3 drops. At the same time, relay F2L is deenergized, and since the step is longer than the release time of that relay, it releases its contacts before the code step is terminated, thereby completing at its back contact c an energizing circuit for impulse registry relay 2A. This circuit may be traced from battery terminal B (Fig. 2B) over front contact c of relay FLBP, wire 69, front contact b of delivery relay FD, wire 70, back contact c of relay F2L, wire 76, front contact b of relay FCR, and thence through the upper winding of relay 2A to battery terminal C. Relay 2A has pole-changing contacts a and b connected in the energizing circuit of relay 4SR.

When relay 2A is in the position shown in the drawings, relay 4SR is energized on the thirteenth step of the code with current of normal polarity. When relay 2A is picked up during the twelfth code step, as described immediately above, its contacts a and b pole change this circuit so as to reverse the polarity of the current to be supplied to control stick relay 4SR. At the same time, contact c prepares a stick circuit for relay 2A to be completed at the beginning of the thirteenth step.

No further action takes place until the end of the twelfth step, which is marked by the picking up of relay FR.

*Thirteenth code step.*—When relay FR picks up, its back contact c opens the circuit of relay F1L and its front contact a closes the circuit of relay F2L. At the same time, front contact b of relay FR closes the circuit of counting chain relay F5 and back contact d of relay FR opens the circuit of relay F4.

Front contact b of relay FR also completes a circuit for the upper winding of relay 4SR and the stick circuit for relay 2A. The circuit for relay 4SR may be traced from battery terminal B (Fig. 2B) over front contact b of relay FR, front contact b of relay FLBP, wire 85, front contact d of delivery relay FD, front contact a of relay 2A, front contact d of relay F4, terminal 83—4, relay 4SR, terminal 86, and front contact b of relay 2A to battery terminal C.

The stick circuit for relay 2A may be traced along the circuit just traced for relay 4SR as far as contact d of relay FD. After passing over that contact, this stick circuit may be traced over front contact c of relay 2A and thence through its lower winding to the opposite battery terminal C. This circuit remains completed throughout the thirteenth code step.

When relay F5 picks up at the beginning of the thirteenth step, it opens the slow release connection for relay F4, which drops, thereby opening at its front contact d the circuit for relay 4SR. Hence relay 4SR is energized only for a short period at the beginning of the thirteenth step.

Since the thirteenth step is short, relay 1A is not picked up, and hence if a relay 5SR corresponding to 1SR were provided, it would be energized with current of normal polarity during the fourteenth step.

*Fourteenth and fifteenth code steps.*—These are short steps, similar to the previously described short code steps. On the fourteenth step, relay F6 picks up and relay F5 drops. On the fifteenth step, relay F7 picks up and relay F6 drops.

*Sixteenth code step.*—When relay FR drops, at the beginning of this step, its front contact a opens the circuit of relay F2L and its back contact c closes the circuit of relay F1L. At the same time, front contact b of relay FR opens the circuit of relay F7 and back contact d completes a pickup circuit for relay F16, which may be traced over back contact b of relay F6, front contact a of relay F7, front contact c of relay FCR, and back contact f of relay F8. Relay F16 in picking up completes its own stick circuit at its front contact b, and its back contact a opens the slow releasing connection of relay F7. Back contact c of relay F16 opens the circuit of delivery relay FD.

Relay F2L having been deenergized at the beginning of the code step, now releases its contacts, and relays LC, LB, and LBP of the timing chain release their contacts in sequence. When relay LBP drops, its front contact c opens the circuits of relays FCR and S, and its front contact d opens the circuit of relay F16. Front contact a of relay FLBP opens the circuit of relay F1L, which drops after its release time expires. All the relays and circuits at the field station are then restored to their normal positions.

*Central station calling field station followed by transmission of indication code to office from field station*

It will now be assumed that the central station transmits the call signal of the field station 123 at a time when the field starting relay FST has dropped due to a change in position of one of the field indicating relays, such as 1R. It will be assumed that both relays 1R and 4R have been picked up by changes in the functions which control them.

The first seven station calling steps of the code are identical with the first seven steps of the code described above, and will not be repeated here. The eighth step is a transmission step. At the beginning of this step, the central station is transmitting and the field station is receiving, while at the end the field station has been conditioned to start transmission and the central station to receive. This step will be described first, considering both the operation at the central station and at the field station during that step. This will be followed by a description of the transmission of steps 9 to 16 by the field station, and thereafter I will describe the reception of steps 9 to 16 at the central station.

*Eighth code step.*—At the central station, relay R drops at the beginning of the eighth code step, opening its front contact *a* to deenergize relay 2L and closing its back contact *b* to complete a circuit for relay 1L. At the same time, front contact *b* of relay R opens to break the circuit for relay 7 and back contact *d* of relay R closes to complete the energizing circuit of relay 8. When relay 8 picks up, its back contact *d* breaks the slow releasing connection of relay 7, and front contact *b* of relay 8 completes the pickup circuit for relay CR.

The action at the field station up to this point is a reflection of the action at the central station. Briefly, relay F1L is picked up, relay F2L is deenergized, and relay F7 is deenergized. Relay F8 picks up and causes relay F7 to drop and also completes a pickup circuit for relay FCR.

At the central station, when relay 8 picks up, its back contact *a* opens the energizing circuit of master relay M and transmitter relay T. After its release time expires, relay M drops, thereby deenergizing electromagnet SM which releases pawl 27 to operate the stepping switch 20, although that operation is not important at this point. When relay M drops, its contacts *b* and *c* place relay R under control of radio receiver 19, which is connected to antenna 17 over back contact *a* of relay M. The central station is then in condition to receive a code.

The release times of relay 2L at the central station and relay F2L at the field station both expire at substantially the same time. When the relays 2L and F2L drop, the relays LP and FLP are deenergized and after their release time expires, those relays drop in turn.

When relay FLP at the field station drops, it completes a pickup circuit for the field master relay FM. This circuit may be traced from battery terminal B (Fig. 2C) over back contact *a* of the field starting relay FST, front contact *e* of relay F8, front contact *f* of relay FCR, wire 87, back contact *f* of relay F2L, back contact *b* of relay FLP, and thence through the winding of relay FM to the opposite battery terminal *y* C. When relay FM picks up, its front contact *b* completes its own stick circuit, which may be traced from battery terminal B (Fig. 2C) over back contact *d* of relay F16, wire 88, front contact *c* of relay FLP, front contact *b* of relay FM, and through the winding of relay FM to battery terminal C.

When relay FM picks up, its front contact *c* completes a pickup circuit for transmitter relay FT, which may be traced from battery terminal B (Fig. 2C) over back contacts *e* of relays F7, F5, F3, and F1, wire 89, front contact *c* of relay FM, and thence through the winding of transmitter relay FT and resistors 90 and 91 to battery terminal C.

Front contact *g* of relay FM closes a pickup circuit for field starting relay FST. This circuit may be traced from battery terminal B (Fig. 2C) over front contact *g* of relay F8, front contact *j* of relay FCR, wire 80, front contact *g* of relay FM, wire 79, back contact *a* of relay FD, front contact *d* of relay S, the winding of relay FST and thence over contacts *a* of relays 1R and 4R to battery terminal C.

When relay FST picks up, its front contact *b* completes a stick circuit which may be traced from that contact over front contact *c* of relay S, wire 78, front contact *b* of relay FLB, wire 79, front contact *a* of relay FD, front contact *d* of relay S, through the winding of relay FST and thence over contacts *a* of relays 1R and 4R to battery terminal C. This stick circuit remains completed until the end of the code.

As relay FM picks up, its contacts *d* and *e* transfer control of receiver relay FR from the radio receiver F19 to contacts *a* and *b* of transmitter relay FT. The field station is then in condition to transmit a code. When transmitter relay FT picks up, its front contacts *a* and *b* close to pick up relay FR and its front contact *c* closes to start the transmission of an impulse which marks the end of the eighth code step and the beginning of the ninth.

*Ninth code step.*—As mentioned before, in the ninth to sixteenth code steps immediately following, only the operation of the field station equipment will be considered.

When relay FR picks up, its back contact *c* deenergizes relay F1L and its front contact *a* completes a circuit for relay F2L. Front contact *c* of relay F2L picks up relay FLP. When back contact *d* of relay FR opens, it breaks the circuit of relay F8. Closure of front contact *b* of relay FR completes a circuit for relay F1, which may be traced over wire 68, front contact *e* of relay FCR, back contact *b* of relay F7, and front contact *a* of relay F8. Relay F1 in picking up breaks the slow releasing connection for relay F8 at its back contact *a*.

When relay F1 picks up, its front contact *f* completes a stick circuit for transmitter relay T. This circuit may be traced over the front contact *b* of relay 1R, terminal 92—1, front contact *f* of relay F1, wire 93, front contact *c* of relay FLP in parallel with front contact *e* of relay F1L, front contact *d* of relay FT, and thence through the winding of relay FT. This stick circuit is effective to maintain relay FT energized until both relays F1L and FLP release their contacts, and is therefore effective to make the ninth code step long. It may be seen that if relay 1R were deenergized, its front contact would be opened and the stick circuit just traced would not be completed when relay F1 picked up. Back contact *e* of relay F1 would then be effective to open the transmitter relay circuits, thereby terminating the ninth code step, which would consequently be short.

However, since the stick circuit for transmitter relay FT has been completed, the ninth code step continues until relay F1L, having been deenergized at the beginning of the code step, releases its contacts, thereby deenergizing relay FLP. After relay FLP releases its contacts at the expiration of its release time, the stick circuit for transmitter relay FT is broken, and it drops its contacts, thereby deenergizing relay FR and terminating the ninth code step.

*Tenth code step.*—When relay FR drops, it picks up relay F1L and opens the circuit to relay F2L. When relay F1L picks up, it closes the circuit to relay FLP.

When relay FR drops, its front contact *b* opens the circuit to relay F1, and its back contact *d* completes a circuit for relay F2. When relay F2 picks up, its back contact *a* breaks the slow releasing connection for relay F1, which thereupon drops. Back contact *e* of relay F1 then completes the energizing circuit for transmitter relay FT, which picks up, thereby picking up relay FR to terminate the tenth code step and start the eleventh. Since the tenth code step is short, relay FLP remains up.

*Eleventh code step.*—When relay FR picks up, it opens the circuit to relay F1L and closes the circuit to relay F2L. Relay F2 is deenergized by the opening of back contact *d* of relay FR and relay F3 is picked up by the closing of front contact *b*. When relay F3 picks up, its back contact *e* opens the pickup circuit for transmitter relay FT, which thereupon drops, dropping relay FR and terminating the eleventh code step and starting the twelfth.

*Twelfth code step.*—When relay FR drops, it picks up relay F1L and opens the circuit to relay F2L. At the same time, its back contact *d* closes a circuit for relay F4 and its front contact *b* opens the circuit for relay F3. When relay F4 picks up, its back contact *a* opens the slow releasing connection for relay F3, which thereupon drops. Back contact *e* of relay F3 completes the pickup circuit for relay FT, but this pickup circuit is prevented from becoming effective by a holddown circuit which is completed over front contact *f* of relay F3. This hold-down circuit may be traced over front contact *b* of relay 4R, terminal 92—4, front contact *f* of relay F4, wire 94, front contact *b* of relay FLP in parallel with front contact *g* of relay F2L, back contact *e* of relay FT, and thence through resistances 90 and 91 to the opposite battery terminal C. This holddown circuit is effective to keep the transmitter relay FT from picking up until both front contact *g* of relay F2L and front contact *d* of relay FLP are opened by the dropping of those two relays.

Relay F2L, having been deenergized when relay FR dropped, releases its contacts at the expiration of its release time. This opens the circuit for relay FLP which likewise releases its contacts upon the expiration of its release time. These two relays are hence effective to make the twelfth step a long one. When front contact *d* of relay FLP opens, the pickup circuit for relay FT, previously traced, becomes effective to energize its winding and cause it to pick up its contacts, thereby picking up relay FR, terminating the twelfth code step and starting the thirteenth.

*Thirteenth, fourteenth, and fifteenth code steps.*—These steps are typical short code steps, steps 13 and 15 corresponding to step 11 and step 14 corresponding to step 12. The only differences between the steps are in the numbers of the particular counting chain relays which are picked up on each step.

*Sixteenth code step.*—When relay FR drops, it picks up relay F1L and opens the circuit to relay F2L. At the same time, it opens the circuit of relay F7 and completes a circuit for relay F16. Relay F16 in picking up drops relay F7 and at its back contact *d* opens the stick circuit for relay FM, which drops, thereby opening at its front contact *c* the pickup circuit of transmitter relay T.

When relay FM drops, its back contact *g* bridges front contact *b* of relay FLB in the stick circuit for relay FST, so that the stick circuit remains completed after relay FLB drops as described below and until relay S drops to reestablish the normal stick circuit of relay FST.

Relay F2L, having been deenergized at the beginning of this code step, releases its contacts, and is followed in order by the release of relays FLP, FLB, and FLBP of the timing chain. When relay FLBP drops, its front contact *a* opens the circuit of relay F1L, its front contact *c* opens the circuits of relays FCR and S, and its front contact *d* opens the circuit of relay F16. When these relays drop, all the transmitting and coding equipment at the field station has been returned to its normal condition.

*Reception of indication code by central station*

There will now be described the operation of the central station equipment as it receives the indication code described in steps 9 to 16 immediately above.

*Ninth code step.*—Receiver relay R is now under control of the radio receiver 19, since master relay M is deenergized. When the field station starts transmitting the ninth step, relay R picks up, thereby opening the circuit of relay 1L and picking up relay 2L. Relay 2L picks up relay LP. However, relay LP performs no function during the receipt of an indication code at the central station, and its movements during the receipt of this indication code will therefore not be mentioned further.

When relay R picks up, it opens the circuit for relay 8 and closes a circuit for counting chain relay 1. Relay 1 in picking up opens the slow release connection for relay 8, which thereupon drops.

Relay 1L, having been deenergized at the beginning of the ninth code step releases its contacts at the expiration of its release time. This occurs during the ninth code step, which is made long by the transmitting field station. When relay 1L drops, its back contact *f* completes a pickup circuit for indication registry relay 9. This circuit may be traced from battery terminal B (Fig. 1B) over front contact *c* of relay LBP, back contact *f* of relay 1L, wire 59, front contact *c* of relay CR, front contact *h* of counting chain relay 1, and thence through the winding of relay 9 to the opposite battery terminal C. Front contact *a* of relay 9 closes a stick circuit for that relay which extends over front contact *e* of relay LBP, and the relay 9 remains up through the rest of the code.

*Tenth code step.*—When relay R drops, it picks up relay 1L and opens the circuit of relay 2L. At the same time, it opens the circuit of counting chain relay 1 and completes a circuit for relay 2. Relay 2 in picking up breaks the slow release connection for relay 1, which releases its contacts. The tenth code step is shorter than the release time of relay 2L, and therefore no further action takes place during the tenth code step. The step is terminated by the picking up of relay R in response to the transmission of a new impulse by the field station.

*Eleventh code step.*—When relay R picks up, it closes the circuit of relay 2L and opens the circuit of relay 1L. At the same time, it deenergizes relay 2 and picks up relay 3 in the counting chain. Relay 2 drops when relay 3 picks up. No further action takes place during this short code step until it is terminated by the dropping of relay R at the end of the impulse transmitted from the field.

*Twelfth code step.*—When relay R drops, it closes the circuit for relay 1L and opens the circuit for relay 2L. At the same time, it deenergizes relay 3 and closes the circuit for relay 4, which picks up, thereby causing relay 3 to drop. The twelfth step is made longer than the release time of relay 2L by the field station, and therefore relay 2L drops as soon as its release time expires. When relay 2L drops, its back contact *g* completes a pickup circuit for impulse registry relay 12. This pickup circuit may be traced from battery terminal B (Fig. 1B) over front contact c of relay LBP, back contact g of relay 2L, wire 63, front contact d of relay CR, front contact h of relay 4, and thence through the winding of relay 12 to the opposite battery terminal C. When relay 12 picks up, its front contact a completes its stick circuit, and it remains up for the rest of the code. The twelfth step is terminated by the picking up of relay R in response to the transmission of another impulse by the field station.

*Thirteenth, fourteenth, and fifteenth code steps.*—These are typical short steps, the thirteenth and fifteenth steps corresponding to the eleventh and the fourteenth step corresponding to the tenth.

*Sixteenth code step.*—When relay R drops at the beginning of the sixteenth step, it closes the circuit for relay 1L and opens the circuit for relay 2L. At the same time, it opens the stick circuit for relay 7 and completes the pickup circuit for relay 16. When relay 16 picks up, its front contact b completes a circuit for delivery relay D. This circuit may be traced over back contact d of relay STP, front contact b of relay 16, wire 107, terminals 95 and 96, front contact f of relay 123S, and through the winding of relay D to the opposite battery terminal C.

When relay D picks up, its front contacts a and b complete circuits for relays 1K and 4K, respectively. The circuit for relay 1K may be traced over front contact b of registry relay 9, terminals 38—1 and 39—1, front contact a of relay D and through the winding of relay 1K. The similar circuit for relay 4K may be traced over front contact b of registry relay 12, terminals 38—4 and 39—4, and front contact b of relay D to the winding of relay 4K. When relay 1K picks up, its front contact a completes a circuit for indicating lamp 41, and when relay 4K picks up its front contact a completes a circuit for indicating lamp 42.

It may be seen that by the transmission of this indication code from the field station, lamp 41 is made to indicate the position of the contacts of relay 1R and lamp 42 is made to indicate the position of the contacts of relay 4R. If either of those contacts is opened, its particular indicating lamp is deenergized upon the transmission of an indication code to the central station. If the particular relay contact is closed at the field station, then the associated indicating lamp at the central station is energized. It will be readily seen that any contact at the field station may be made to control a lamp at the central station. The field station contact may be controlled by any desired condition and may or may not be operated by a relay, as shown. The indicating lamp at the central station can be connected to be lighted either when the contact at the field station is open or closed, as desired. Relays 1K and 4K are provided with stick circuits which extend over their own front contacts b and back contacts a and b, respectively, of relay D. These stick circuits insure that once the relays 1K and 4K are picked up, they remain up until dropped by a subsequent code received from the field station.

After its release time has expired, relay 2L drops, and is followed in sequence by the dropping of relays LP, LB, and LBP of the timing chain. When relay LBP drops, its front contact a opens the circuit of relay 1L. Its front contact c opens the circuit of relays CR, 123S, and SP. Its front contact d opens the circuit to relay 16 and its front contact e opens the circuit to relays 9 and 12. When relay 123S drops, its front contact f opens the circuit of relay D. Relay 1L drops as soon as its release time has expired, thereby closing its back contact a to complete the energizing circuit of master relay M and start transmission of the next station call signal.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In a system for the control of indication relays at a central station in accordance with the condition of movable contacts at remote stations by means of codes of impulses transmitted over a single communication channel connecting all of the stations, said system including at each station, a transmitter relay, a receiving relay, a chain of counting relays operable through a first and second cycle to count the impulses of a code supplied to the receiving relay, and station selecting relays controlled by the counting relays for registering the impulses, the combination with the foregoing of station selecting means effective following each period of rest constituting an interval between successive codes for causing the central station transmitter relay to supply a series of impulses to all of the receiving relays to effect a first cycle of operation of the counting relays and for coding such impulses to render each series effective to operate a station selecting relay at a particular remote station and to concurrently operate a corresponding relay at the central station, said station selecting means acting to operate the selecting relays for the different stations by a series of codes transmitted one at a time in a recurring program, means responsive to the operation of the station selecting relay at any remote station and effective when the associated counting relays complete their first cycle of operation for causing the associated transmitter relay to supply impulses to the receiving relays to effect a second cycle of operation of the counting relays at the central station and at such remote station, and for coding such impulses in accordance with the condition of the movable contacts at that station, and means controlled by the operated central station relay for selecting a corresponding group of indication relays for operation in accordance with the code character of such impulses.

2. In a system for the control of indication relays at a central station in accordance with the condition of movable contacts at remote stations by means of codes of impulses transmitted over a single communication channel connecting all of the stations, said system including at each station, a transmitter relay, a receiving relay, a chain of counting relays operable through a first and second cycle to count the impulses of a code supplied to the receiving relay, a starting relay at each remote station responsive to a change in condition of any of the movable contacts at such station, the combination with the foregoing of station selecting means effective following each period of rest constituting an interval between successive codes for causing the central station transmitter relay to supply a series of impulses to all of the receiving relays for operating the counting relays through their first cycle, said impulses constituting a code call for a particular remote station, said means being arranged to cause the transmission of the code calls for the different remote stations sequentially in a recurrent program, and means responsive to the reception of its code call at a station having its starting relay operated for causing the associated transmitter relay to supply impulses to the receiving relays to effect a second cycle of operation of the counting relays at such station and at the central station, and means including the movable contacts at such remote station for coding the impulses of said second cycle for operation of the corresponding indication relays.

3. In a system for the control of indication relays at a central station in accordance with the condition of movable contacts at remote stations and for the operation of control relays at the remote stations in accordance with the positions of control levers at the central station by means of codes of impulses transmitted over a single communication channel connecting all of the stations, said system including at each station, a transmitter relay, a receiving relay, a series of counting relays operable through a first and second cycle to count the impulses of a code supplied to the receiving relay, station selecting relays controlled by the counting relays for registering the code impulses, and starting relays including one at each remote station and one for each remote station at the central station, the combination with the foregoing of station selecting means effective following each period of rest constituting an interval between successive codes for causing the central station transmitter relay to supply a series of impulses to all of the receiving relays to effect a first cycle of operation of the counting relays and for coding such impulses to render each series effective to operate a station selecting relay at a particular remote station and to concurrently operate a corresponding relay at the central station, said station selecting means acting to operate the station relays for the different stations by a series of codes transmitted one at a time in a recurring program, means controlled by the operated selecting relay at the central station effective only when the associated starting relay is operated for causing the continued operation of the central station transmitter relay to effect a second cycle of operation of the counting relays at the central station and at the selected remote station and for coding such impulses in accordance with the condition of selected control levers to effect the operation of the control relays at the selected station, and means controlled by the selecting relay at the selected remote station effective when the associated counting relays complete their first cycle of operation only if the starting relay at the selected station is operated but the corresponding central station starting relay is not operated for causing the transmitter relay at such remote station to supply impulses to the receiving relays to effect a second cycle of operation of the counting relays and for coding such impulses in accordance with the condition of the movable contacts at such station to effect the operation of the corresponding indication relays at the central station.

4. In a system for the control of indication relays at a central station in accordance with the condition of movable contacts at remote stations and for the operation of control relays at the remote stations in accordance with the positions of control levers at the central station by means of codes of impulses transmitted over a single communication channel connecting all of the stations, said system including at each station, a transmitter relay, a receiving relay, a series of counting relays operable through a first and second cycle to count the impulses of a code supplied to the receiving relay, station selecting relays controlled by the counting relays for registering the code impulses, the combination of the foregoing with station selecting means effective following each period of rest constituting an interval between successive codes for causing the central station transmitter relay to supply a series of impulses to all of the receiving relays to effect a first cycle of operation of the counting relays and for coding such impulses to render each series effective to operate a selecting relay at a particular remote station and to concurrently operate a corresponding selecting relay at the central station, and manually controllable means at the central station for controlling a particular impulse in said series which if of one character causes the transmission of a second series of impulses by the central station transmitter and if of another character causes the transmission of a corersponding series of impulses by the transmitter at the selected station, whereby the counting relays at the central station and at the selected remote station are operated through a second cycle by impulses which are effective either to operate the control relays at the selected station in accordance with the positions of the corresponding control levers or to operate indication relays at the central station in accordance with the condition of the movable contacts at the selected station, depending upon the code character of said particular impulse.

GEORGE W. BAUGHMAN.

REFERENCES CITED

The following references are of record in the file of this patent:

UNITED STATES PATENTS

| Number | Name | Date |
|---|---|---|
| 1,632,106 | Zogbaum | June 14, 1927 |
| 1,870,997 | Jipp et al. | Aug. 9, 1932 |
| 2,111,352 | Blake et al. | Mar. 15, 1938 |
| 2,350,146 | Borgeson | May 30, 1944 |
| 2,444,078 | Weaver | June 29, 1948 |
| 2,501,063 | Levin | Mar. 21, 1950 |